INVENTOR
RICHARD F. J. FILIPOWSKY

BY J. Tauin Jr.
ATTORNEY

April 9, 1968 R. F. J. FILIPOWSKY 3,377,625

DIGITAL COMMUNICATION SYSTEM

Filed Oct. 7, 1966 11 Sheets-Sheet 6

April 9, 1968 R. F. J. FILIPOWSKY 3,377,625

DIGITAL COMMUNICATION SYSTEM

Filed Oct. 7, 1966 11 Sheets-Sheet 8

United States Patent Office 3,377,625

Patented Apr. 9, 1968

3,377,625

DIGITAL COMMUNICATION SYSTEM

Richard F. J. Filipowsky, Huntsville, Ala., assignor to International Business Machines Corporation, Armonk, N.Y., a corporation of New York Continuation-in-part of application Ser. No. 465,880, June 22, 1965. This application Oct. 7, 1966, Ser. No. 585,142

22 Claims. (Cl. 340—172.5)

ABSTRACT OF THE DISCLOSURE

Digital communications systems employing finite sets of highly distinguishable transmission waveforms for transmitting information, each waveform being defined by the product of two or more harmonically related sinusoids, comprising: a transmitter including means for encoding each elemental message portion into one of the predetermined set of wideband waveforms wherein the waveforms are defined by the product of a plurality of harmonically related sinusoids over a given period of the fundamental frequency, a communication channel, and a receiver including optimum detection means for detecting which members of the set of wideband waveforms were transmitted.

This application is a continuation-in-part of application Ser. No. 465,880, filed June 22, 1965, now abandoned. The invention relates to digital communication systems employing finite sets of highly distinguishable transmission waveforms for transmitting information. More particularly, this invention relates to digital communication systems wherein the transmission waveforms are defined by the product of two or more harmonically related sinusoids.

The majority of the prior art digital communication systems employ analog techniques for the transmission of signals. In such communication systems, the rectangular digital waveforms, such as are used in digital computers, serve to modulate a carrier wave by means of well known amplitude, frequency, or phase modulation techniques. At the receiver a suitable analog demodulator operates on the modulated carrier wave to recover the original rectangular waveform as accurately as possible. Such communication systems are subject to the disadvantage that the digital waveforms which are finally reproduced at the output of the receiver are affected not only by the actual digital information transmitted, but also by the instantaneous phase difference between the carrier and the system clock, as well as on the detailed filter characteristics of all the filters in the transmission channel, and on random noise.

Communication systems using truly digital transmission techniques possess certain advantages over the prior art systems. In such communication systems, the rectangular digital waveforms serve to select members of a predetermined finite set of highly distinguishable transmission waveforms. The pre-knowledge of the characteristics of each member of the set of transmission waveforms can be used to design receiving apparatus including a set of optimum detection devices, each of which is responsive to only one member of the set of transmission waveforms. Hence, in spite of the fact that the predetermined transmission waveforms are subject to the inevitable distortion and random noise factors, each optimum detection device is capable of making the simple decision as to whether it is more probable than not that its associated transmission waveform was received during a particular transmission interval.

From the foregoing it is apparent that digital communication systems using predetermined sets of transmission waveforms in combination with optimum detection devices are relatively insensitive to noise and channel distortion. This characteristic is most pronounced when the members of the set of transmission waveforms are highly distinguishable from each other. Waveforms having a distinguishability of the highest possible order are known as orthogonal waveforms. Therefore, digital communication systems using orthogonal waveforms in combination with optimum detection devices would be expected to deliver superior performance in the presence of large amounts of random noise and channel distortion.

In digital communication systems using large sets of predetermined transmission waveforms each waveform may carry several bits of information. Such communication systems are called "$n$-ary" systems or "high order alphabet systems." If the set of transmission waveforms is carefully chosen, such "$n$-ary" communication systems can provide extremely efficient utilization of the available channel bandwidth.

A chief obstacle to the full exploitation of the benefits of truly digital transmission techniques has been the difficulty and expense of generating large sets of highly distinguishable transmission waveforms. It has proven especially difficult to generate large sets of orthogonal waveforms. Moreover, prior attempts to generate such waveforms have usually resulted in waveforms having sharp discontinuities. Waveforms having sharp discontinuities are undesirable because they require transmission channels of very large bandwidth in order to avoid serious distortions.

It is, therefore, an object of this invention to provide improved means for generating very large sets of highly distinguishable waveforms.

Another object of this invention is to provide means for generating large sets of orthogonal waveforms.

It is also an object of this invention to provide means for generating sets of orthogonal waveforms which have few sharp discontinuities.

It is still another object of this invention to provide sets of band-limited waveforms which can be directly generated for use in pass band carrier channels and which do not require a separate oscillator and modulator for being converted from a base-band to a carrier band.

I have discovered that the above objects are satisfied by certain waveforms defined by the product of two or more harmonically related sinusoidal functions taken over an interval equal to one-half the period of the fundamental frequency. Large sets of such waveforms, hereinafter designated product waveforms, may be generated from a relatively small number of harmonically related sinusoids. Furthermore, each full set of product waveforms will contain several subsets whose members will be orthogonal to each other. In addition, product waveforms possess few discontinuities, and are band-limited so as to permit efficient utilization of the available bandwidth of the communication channel.

It is, therefore, an object of this invention to provide means for generating product waveforms.

It is also an object of this invention to provide a digital transmission system using product waveforms.

In accordance with the above objects, I provide a digital transmission system using product waveform generators in combination with optimum detection devices. In the transmitter I provide means for generating a plurality of harmoncially related sinusoids, means for multiplying selected groups of said sinusoids, and means responsive to the input data for gating the resulting product waveforms into the transmission channel. At the receiver, I provide means for generating a number of harmonically related sinusoids, and means for multiplying selected groups of said sinusoids in order to produce product waveforms corresponding to the product waveforms generated at the transmitter. I further provide cross-correlation means for cross-correlating the received signals with each of these product waveforms. Such cross-correlation means might comprise means for multiplying the received signals with each of the product waveforms generated at the receiver, and means for integrating each of the resulting products. A decision device responsive to the cross-correlation means is provided for determining which of the product waveforms were transmitted.

An advantage of my invention is the precision with which all the waveforms can be produced. Since all components of any waveform are harmonically derived from a fundamental frequency, it is easily possible to drive all generators and the synchronization devices from the same highly precise master timer.

Another advantage of my invention flows from the multiplicative formation of the waveforms. Because of this feature, the orthogonal character of an orthogonal subset of product waveforms is retained even if the individual components of the product waveforms contain small amplitude errors. Such amplitude errors will appear only as amplitude variations of the product waveform; not as waveform distortions. This is distinguished from the case of waveforms generated by the summation of components wherein an amplitude variation in the component will appear as a distortion of the final summation waveform.

A further advantage of my invention is the fact that each set of product waveforms contains at least one subset with members which restrict their energy to a smaller bandwidth than other subsets. This permits adaptive systems with variable bandwidth by the selection of subsets with the maximum number of waveforms filling the instantaneously available bandwidth; but not exceeding it.

Still another advantage of my invention is in providing a digital communication system using a set of highly distinguishable waveforms which may be readily expanded to take advantage of low noise environments.

Another advantage of my invention flows from the fact that a composite signal formed by superposing my product waveforms will have a rather uniform or noise-like spectral density over the larger part of its bandwidth. Communications theory has established that an efficient transmission system should use signals having such a noise-like character.

Other objects and advantages of my invention will be pointed out in the following description and claims and illustrated in the accompanying drawings, which disclose, by way of example, the principle of the invention and the best mode which has been contemplated of applying that principle.

Figure 1:
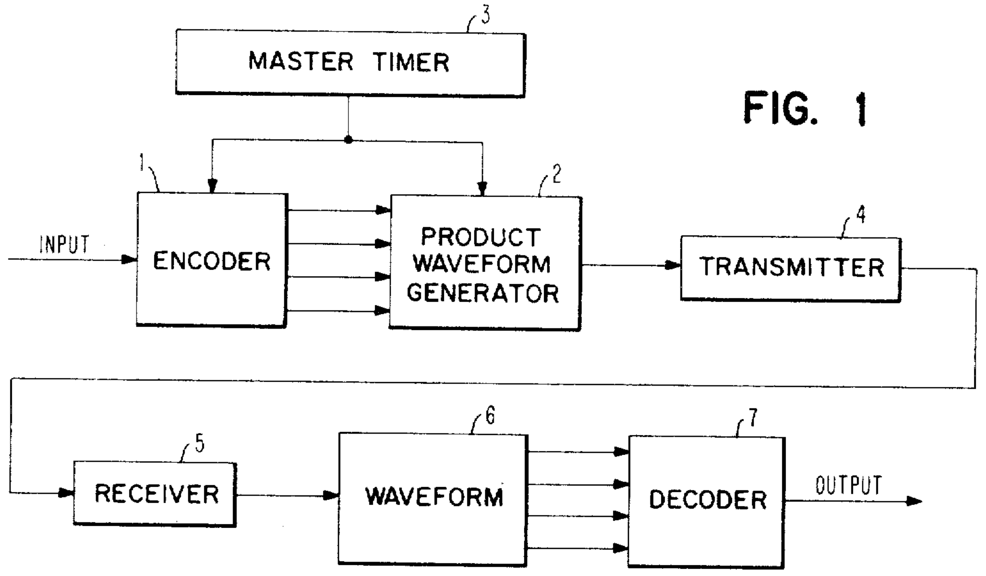
FIG. 1 shows a block diagram of a digital communications system using product waveforms.

Before describing the detailed structure and operation of a specific communication system using my invention, it is desirable to present a general discussion of the features and properties of product waveforms.

*General discussion*

Expressed mathematically, the product waveforms utilized in my communication system are defined by:

(1)

$$f_{q,k,q}(t)=A\ \sin\left(s_1\omega_0t+r_1\frac{\pi}{1}\right)\sin\left(2s_2\omega_0t+r_2\frac{\pi}{2}\right)\cdots\sin\left(ks_k\omega_0t+r_k\frac{\pi}{2}\right)$$

for $$-\frac{\pi}{2}\leq\omega_0t\leq+\frac{\pi}{2}$$

with $$\omega_0=2\pi f_0 f_{p,k,q}(t)=0$$

where $$\omega_0t<-\frac{\pi}{2};+\frac{\pi}{2}<\omega_0t$$

K is a positive integer indicating the highest harmonic of the fundamental frequency, $f_0$, participating in a particular product waveform. K designates the "class" of the waveform. $s_1$, $s_2$, $s_1$ . . . $s_K$ may assume the value 0 or 1; $r_1$, $r_2$, $r_1$ . . . $r_K$ may assume the value 0 or 1 (notice that the simultaneous selection of any $s=r=0$ leads necessarily to the trivial case: $f\equiv0$); $p$ is the number of non-trivial sine and cosine factors participating a particular product waveform, $p$ designates the "order" of the waveform; $q$ is a positive integer indicating the "rank" of a product waveform within a set of waveforms with equal $p$ and $k$ indices when all waveforms of such a set are placed in their "natural" ranking. The natural rank of a product waveform is defined as its ranking list of product waveforms which starts with all sine functions and with the lowest possible grouping of indices and ends with all cosine functions and the highest possible grouping of indices. All terms are permuted from sine to cosine, starting with the term on the left hand end of the equation.

As an example of the rank of waveforms, I list some typical waveforms of the class 8, order 4 in their natural sequence (with many omissions between the few examples).

$f_{4,8,1}$ = sin X·sin 2X·sin 3X·sin 8X
$f_{4,8,2}$ = cos X·sin 2X·sin 3X·sin 8X ] 2
$f_{4,8,3}$ = sin X·cos 2X·sin 3X·sin 8X
$f_{4,8,4}$ = cos X·cos 2X·sin 3X·sin 8X ] 4
$f_{4,8,5}$ = sin X·sin 2X·cos 3X·sin 8X
⋮
$f_{4,8,8}$ = cos X·cos 2X·cos 3X·sin 8X ] 8
$f_{4,8,9}$ = sin X·sin 2X·sin 3X·cos 8X
⋮
$f_{4,8,16}$ = cos X·cos 2X·cos 3X·cos 8X ] 16
$f_{4,8,17}$ = sin X·sin 2X·sin 4X·sin 8X
⋮
$f_{4,8,29}$ = sin X·sin 2X·cos 4X·cos 8X
⋮
$f_{4,8,32}$ = cos X·cos 2X·cos 4X·cos 8X ] 16
$f_{4,8,33}$ = sin X·sin 3X·sin 4X·sin 8X
⋮
$f_{4,8,48}$ = cos X·cos 3X·cos 4X·cos 8X ] 16
$f_{4,8,49}$ = sin 2X·sin 3X·sin 4X·sin 8X
⋮
$f_{4,8,64}$ = cos 2X·cos 3X·cos 4X·cos 8X ] 16
$f_{4,8,65}$ = sin X·sin 2X·sin 5X·sin 8X
⋮
$f_{4,8,560}$ = cos 5X·cos 6X·cos 7X·cos 8X ] 31 blocks of 16 waveforms each Total number of waveforms of class 8 and order 4 is 35×16=560.

Equation 1 is sufficiently general to cover all possible product waveforms. Naturally, Equation 1 contains, as special cases, all trivial cases, such as $f_{0,1,1}=1$, which results from the selection $K=1$; $s_K=0$; $r_K=1$. The simple sine functions, $f_{1,1,1}=\sin \omega_0 t$, results from the selection $K=1$; $s_K=1$; $r_K=0$ and the cosine function, $f_{1,1,1}=\cos \omega_0 t$, results from the selection of $K=1$; $s_K=1$; $r_K=1$. These two functions are the only functions in class one.

The "level" of a set of product waveforms is determined by the highest "class" of any waveform in the set but the set may contain waveforms of lower class. It can be seen from Table I that level 1 has a total of 3 waveforms, and level 2 a total of 9 waveforms. These 9 consist of the 3 waveforms of level 1 plus the two waveforms of first order and second class plus the four product waveforms of second order and second class. This can be continued, recognizing that level 3 contains 27 waveforms and level four 81 waveforms, each level automatically including all waveforms of all lower levels. Hence, it can be seen that the maximum number of product waveforms increases rapidly with an increase in level.

It is easy to see the general rule determining the maximum number of waveforms for any given level $k$. Each term in Equation 1 may assume one of three states; sin $(k\omega_0 t)$, cos $(k\omega_0 t)$, or 1. The maximum number of factors is equal to the highest value of $k$. The total number $n$ of all possible and different multiple products of the $k$ factors is therefore the number of $k$-permutations of three things (states) with unrestricted repetition (Ref. 12):

$$N=3^K \quad (2)$$

Notice that the total number of waveforms for level 8 is therefore $3^8=6{,}561$, including the trivial case $f_{0,1,1}=1$; including all the 81 waveforms of level 4 which are listed in Table 1 and also including the complete set of 560 waveforms of class 8 and order 4 which has been used above to demonstrate the ranking of waveforms.

TABLE I

| Class | Level: N Add 1 | Level: N Total | Number of Factors (Order): 1 | 2 | 3 | 3 | 4 |
|---|---|---|---|---|---|---|---|
| Ap | 1 | 1 | 1 | $\sqrt{2}$ | 2 | 2 | $2\sqrt{2}$ |
| K=1 | 2 | 3 | sin X<br>cos X | | | | |
| K=2 | 6 | 9 | sin 2X<br>cos 2X | sin X·sin 2X<br>cos X·sin 2X<br>sin X·cos 2X<br>cos X·cos 2X | | | |
| K=3 | 18 | 27 | sin 3X<br>cos 3X | sin X·sin 3X<br>cos X·sin 3X<br>sin X·cos 3X<br>cos X·cos 3X | sin X·sin 2X·sin 3X<br>cos X·sin 2X·sin 3X<br>sin X·cos 2X·sin 3X<br>cos X·cos 2X·sin 3X | | |
| | | | | sin 2X·sin 3X<br>cos 2X·sin 3X<br>sin 2X·cos 3X<br>cos 2X·cos 3X | sin X·sin 2X·cos 3X<br>cos X·sin 2X·cos 3X<br>sin X·cos 2X·cos 3X<br>cos X·cos 2X·cos 3X | | |
| K=4 | 54 | 81 | sin 4X<br>cos 4X | sin X·sin 4X<br>cos X·sin 4X<br>sin X·cos 4X<br>cos X·cos 4X | sin X·sin 2X·sin 4X<br>cos X·sin 2X·sin 4X<br>sin X·cos 2X·sin 4X<br>cos X·cos 2X·sin 4X | sin 2X·sin 3X·sin 4X<br>cos 2X·sin 3X·sin 4X<br>sin 2X·cos 3X·sin 4X<br>cos 2X·cos 3X·sin 4X | sin X·sin 2X·sin 3X·sin 4X<br>cos X·sin 2X·sin 3X·sin 4X<br>sin X·cos 2X·sin 3X·sin 4X<br>cos X·cos 2X·sin 3X·sin 4X |
| | | | | sin 2X·sin 4X<br>cos 2X·sin 4X<br>sin 2X·cos 4X<br>cos 2X·cos 4X | sin X·sin 2X·cos 4X<br>cos X·sin 2X·cos 4X<br>sin X·cos 2X·cos 4X<br>cos X·cos 2X·cos 4X | sin 2X·sin 3X·cos 4X<br>cos 2X·sin 3X·cos 4X<br>sin 2X·cos 3X·cos 4X<br>cos 2X·cos 3X·cos 4X | sin X·sin 2X·cos 3X·sin 4X<br>cos X·sin 2X·cos 3X·sin 4X<br>sin X·cos 2X·cos 3X·sin 4X<br>cos X·cos 2X·cos 3X·sin 4X |
| | | | | sin 3X·sin 4X<br>cos 3X·sin 4X<br>sin 3X·cos 4X<br>cos 3X·cos 4X | sin X·sin 3X·sin 4X<br>cos X·sin 3X·sin 4X<br>sin X·cos 3X·sin 4X<br>cos X·cos 3X·sin 4X | | sin X·sin 2X·sin 3X·cos 4X<br>cos X·sin 2X·sin 3X·cos 4X<br>sin X·cos 2X·sin 3X·cos 4X<br>cos X·cos 2X·sin 3X·cos 4X |
| | | | | | sin X·sin 3X·cos 4X<br>cos X·sin 3X·cos 4X<br>sin X·cos 3X·cos 4X<br>cos X·cos 3X·cos 4X | | sin X·sin 2X·cos 3X·cos 4X<br>cos X·sin 2X·cos 3X·cos 4X<br>sin X·cos 2X·cos 3X·cos 4X<br>cos X·cos 2X·cos 3X·cos 4X |

TABLE OF 4TH LEVEL MULTI-PRODUCT WAVEFORMS

Figure 9:
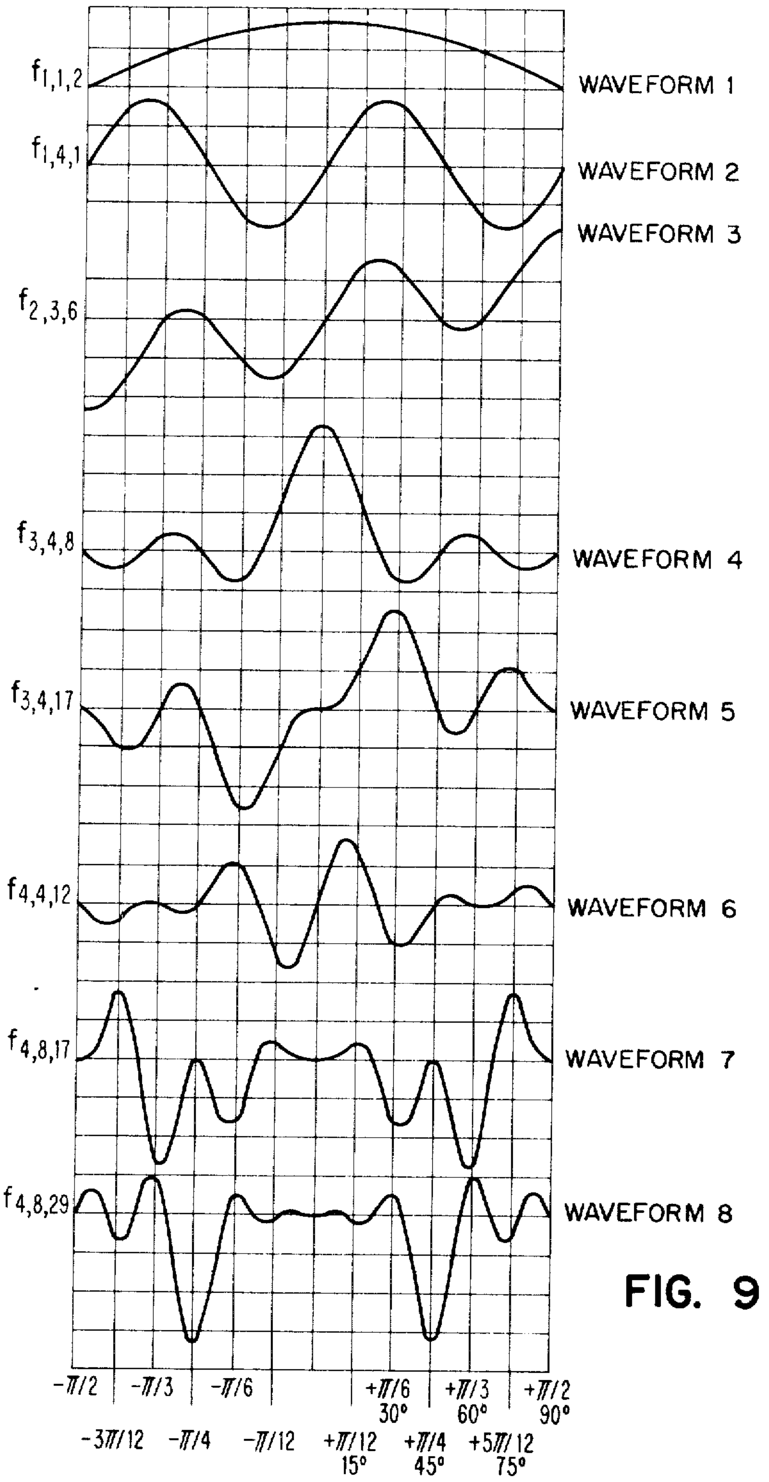
FIG. 9 shows time functions of typical multiple-factor product waveforms.

In addition to their large numbers, product waveforms possess a variety of advantageous properties. For example, FIG. 9 shows the large variety of waveforms which can be generated simply by multiplying sine or cosine functions of harmonically related frequencies. Waveform 1 is the above-mentioned simple cosine function, defined, as all the waveforms, from $$-\frac{\pi}{2}$$

to $$+\frac{\pi}{2}$$

on a normalized $\omega_0 t$ axis. Notice that the definition of the time interval is rather arbitrary. For example, one could define the waveforms from $-\pi$ to $+\pi$ and use $f_0$ as the lowest frequency and this would be identical with the definition above and using $2f_0$ as the lowest frequency, i.e., selecting $s_1=0$; $r_1=1$ for all waveforms. The definition from $$-\frac{\pi}{2}$$

to $$+\frac{\pi}{2}$$

on an $\omega_0 t$ axis is the most convenient one and it automatically includes all waveforms which could be defined for limits at integer multiples of $$\pm\frac{\pi}{2}$$

Waveform 2 in FIG. 9 is an example of the first order waveforms which have been used many times in the prior art. They are truncated sine or cosine functions. In this case it is a waveform of exactly two full periods of a sine function. It results as the special case of a fourth class waveform, selecting in Equation 1 the following coefficients: $s_1=s_2=s_3=0$; $r_1=r_2=r_3=1$; $s_4=1$; $r_4=0$.

Waveforms 3 in FIG. 9 is an example of a second order waveform. This particular waveform results from the choice of $s_1=0$; $r_1=1$; $s_2=1$; $r_2=1$; $s_3=1$; $r_3=0$. Table 1 shows that it has the rank 6 in the set of third class, second order waveforms. Therefore, it has the function symbol $f_{2,3,6}$ (order 2, class 3, rank 6). This particular waveform is at the same time an example of an interesting set of waveforms which can only result when all sine terms have odd frequency multipliers and all cosine terms have even multipliers, i.e., if all $r_{2n-1}=0$; $r_{2n}=1$. This particular subset of waveforms of any rank or order has the characteristic to have its peak values exactly at the end of the time interval where the waveform is being truncated. Although one would normally avoid such waveforms in communications systems because of their wide frequency spectrum, good use can be made of members of this particular set as will be demonstrated hereinafter.

Waveform 4 in FIG. 9 is of a more general character than the previous ones. In this case, we have a waveform of third order and fourth class. It is a member of an orthogonal set of waveforms with particularly smooth characteristics. Such waveforms are discussed below in greater detail.

Waveform 5 in FIG. 9 is a typical example of a general waveform of third order. Table 1 indicates that there are 32 waveforms of third order, out of which 8 belong to class 3 and 24 to class 4. This particular waveform $f_{3,4,17}$ is a member of the class 4 set and has the rank 17. This example shows that the complexity of the waveforms increases with increasing order. But it should be noted that the WT product need not necessarily increase with increasing order. For example, there will always be members in the total set of waveforms of a given order which have a larger WT product than some members of the total set of waveforms of the next higher order. This is particularly true if the class of the waveform of lower order is high and that of the waveform of higher order is low. For example, sin 7X sin 8X has a larger WT product than sin X sin 2X sin 3X. This fact indicates that the extension of the sets of communications waveforms towards higher order multiple factor product waveforms results in a true improvement in communications efficiency.

Waveform 6 in FIG. 9 is a member of the fourth order, fourth class set of 16 waveforms. In this set, as in all sets where class and order are equal, each waveform is a product of all possible harmonic factors, i.e., four factors in this case. Comparing waveform 6 with waveform 5 shows that the increase in order results in a further increase in complexity of the waveform as indicated by the larger number of zero crossings for waveform 6. Notice that both waveform 5 and waveform 6 belong to the same class.

Waveforms 7 and 8 of FIG. 9 are members of the particularly important set of orthogonal waveforms of fourth order and eighth class. Such sets of waveforms contain the maximum number of members for a given WT product, as explained below. It is also interesting to note that the larger number of factors used in the definition of these waveforms enables the simultaneous approach to zero value of the waveform and some of its derivatives. This fact permits the extremely smooth behavior of both these waveforms in the vicinity of $t=0$. It also permits such waveforms to go through a zero value without changing polarity, as seen in waveform 7 around the 45° point.

*Two-factor product waveforms*

In order to more clearly illustrate the principles of my invention, it is convenient to refer initially to a communication system using product waveforms of only two-factors, i.e., product waveforms of the second order. Rewriting Equation 1 so as to express two-factor product waveforms, one obtains:

$$(3)\qquad f_{2,k,q}(t)=A\sin\left(n\omega_0 t+r_1\frac{\pi}{2}\right)\sin\left(m\omega_0 t+r_2\frac{\pi}{2}\right)$$

where $$-\frac{\pi}{2}\leq\omega_0 t\leq+\frac{\pi}{2}\,q=1, 2, \ldots 2K^2$$

$$f_{2,k,q}(t)=0$$

where $$\omega_0 t<-\frac{\pi}{2};\ +\frac{\pi}{2}<\omega_0 t$$

$n$ and $m$ being integers $0\leq n\leq m$; $1\leq m\leq k$; and $r_1$, $r_2=0, 1$.

Notice that this definition includes also degenerate two-factor product waveforms, viz., those where one or both factors degenerate to "1," i.e., waveforms of class 1 and 0.

If the time duration of each product waveform is designated by T, then Equation 1 should be evaluated over the interval $$(4)\qquad -\frac{T}{2}\leq t\leq\frac{T}{2}$$

This determines that the fundamental frequency, $f_0$, of the harmonically related sinusoids is given by $$f_0=\frac{1}{T}$$

In a practical communication system using second order product waveforms, the largest harmonic $k$ of the fundamental frequency depends on the bandwidth (W) available. The product waveform having the index $m=k$ and $n=k-1$ will have a bandwidth (W) approximately equal to $2kf_0$. Thus the time bandwidth (WT) product of any set of waveforms with $m=k$ is equal to $k$ as can be seen from:

$$W=2kf_0=\frac{k}{T};\ WT=k$$

A complete set of second order product waveforms will contain a number of subsets with a variety of characteristics. Some of these special subsets are discussed below.

*The subset of orthogonal waveforms*

Figure 6:
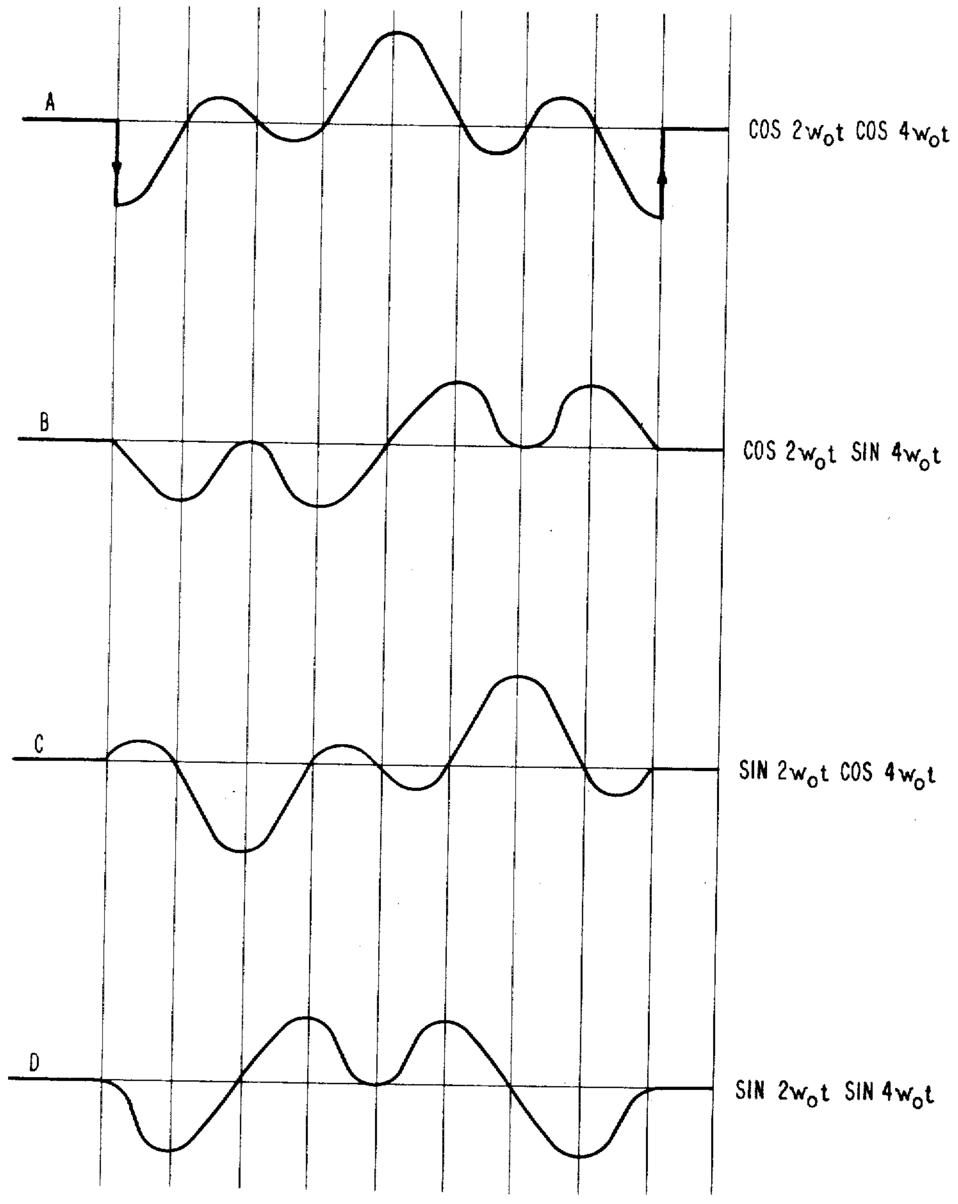
FIG. 6 shows a sample orthogonal subset of the whole set of two-factor product waveforms which may be generated by the product waveform generator shown in FIG. 2.

In general, for any set of two-factor product waveforms having a time-bandwidth product $WT\leq k$ there are several subsets having $k$ orthogonal waveforms each. Usually there are several ways of choosing these subsets of $k$ orthogonal waveforms. For example, when $k=4$ the four waveforms with $m=4$; $n=2$ form the orthogonal subset shown in FIG. 6. It can be easily seen that all four waveforms will be orthogonal to each other, when the two symmetrical ones are mutually orthogonal and also the two skew symmetrical ones. Both statements can be easily verified if all these waveforms are "foldable," and each half of them is again either symmetrical or skew-cylindrical.

In all, the set of 32 two-factor product waveforms for the case $M\leq 4$ contains 8 subsets of 4 orthogonal waveforms each. They are given below with numbers (1–32) arbitrarily assigned to the waveforms and letters (A–H) assigned to the sets.

Set A:
- #1 $\sin \omega_0 t$ — #3 $\sin 3\omega_0 t$
- #2 $\cos \omega_0 t$ — #4 $\cos 3\omega_0 t$ Set B:
- #5 $\sin 2\omega_0 t$ — #7 $\sin 4\omega_0 t$
- #6 $\cos 2\omega_0 t$ — #8 $\cos 4\omega_0 t$ Set C:
- #9 $\sin \omega_0 t \sin 2\omega_0 t$ — #11 $\sin \omega_0 t \cos 2\omega_0 t$
- #10 $\cos \omega_0 t \sin 2\omega_0 t$ — #12 $\cos \omega_0 t \cos 2\omega_0 t$ Set D:
- #13 $\sin \omega_0 t \sin 3\omega_0 t$ — #15 $\sin \omega_0 t \cos 3\omega_0 t$
- #14 $\cos \omega_0 t \sin 3\omega_0 t$ — #16 $\cos \omega_0 t \cos 3\omega_0 t$ Set E:
- #17 $\sin 2\omega_0 t \sin 3\omega_0 t$ — #19 $\sin 2\omega_0 t \cos 3\omega_0 t$
- #18 $\cos 2\omega_0 t \sin 3\omega_0 t$ — #20 $\cos 2\omega_0 t \cos 3\omega_0 t$ Set F:
- #21 $\sin \omega_0 t \sin 4\omega_0 t$ — #23 $\sin \omega_0 t \cos 4\omega_0 t$
- #22 $\cos \omega_0 t \sin 4\omega_0 t$ — #24 $\cos \omega_0 t \cos 4\omega_0 t$ Set G:
- #25 $\sin 2\omega_0 t \sin 4\omega_0 t$ — #27 $\sin 2\omega_0 t \cos 4\omega_0 t$
- #26 $\cos 2\omega_0 t \sin 4\omega_0 t$ — #28 $\cos 2\omega_0 t \cos 4\omega_0 t$ Set H:
- #29 $\sin 3\omega_0 t \sin 4\omega_0 t$ — #31 $\sin 3\omega_0 t \cos 4\omega_0 t$
- #30 $\cos 3\omega_0 t \sin 4\omega_0 t$ — #32 $\cos 3\omega_0 t \cos 4\omega_0 t$ It can be shown that the waveforms within each of the above subsets are orthogonal to each other over the range $$-\frac{\pi}{2}\leq \omega_0 t\leq +\frac{\pi}{2}$$

but it is noted that the waveforms in one set are not necessarily orthogonal to the waveforms of any other set.

Taking advantage of the above grouping, it would seem that an efficient way of utilizing all 32 two-factor product waveforms would be to use all four product waveforms in each orthogonal subset to transmit information in the "multi-digital mode." In the multi-digital mode all four waveforms are superposed during a single transmission interval T. Four bits of information are transmitted in this manner, each bit determining the polarity of one of the four waveforms. Additional information may be transmitted during each transmission interval by the selection of one of the eight orthogonal subsets. Such a selection carries $\log_2 8=3$ bits of information. Hence, a total of 7 bits of information can be transmitted in a signal cell having bandwidth-time product $WT=4$. This transmission rate is very close to the ideal Nyquist rate of 8 bits (2WT) which heretofore was only theoretically achievable with $\sin x/x$ waveforms.

The above method of utilizing all 32 product waveforms may be further elucidated by way of the following example. Assume the following code is fixed for the selection of sets:

| | |
|---|---|
| A+++ | E−++ |
| B++− | F−+− |
| C+−+ | G−−+ |
| D+−− | H−−− |

and assume further that the fourth to seventh bit of any seven bit word determines the polarity of the first to fourth waveform of the selected set. If in this system the seven bit word: −−++−−+ has to be transmitted, the set G will be selected and the composite waveform will follow the equation:

$$f(t)=\sin 2\omega_0 t\cdot\sin 4\omega_0 t-\cos 2\omega_0 t\sin 4\omega_0 t-\sin 2\omega_0 t\cos 4\omega_0 t+\cos 2\omega_0 t\cos 4\omega_0 t=\cos 2\omega_0 t-\sin 6\omega_0 t$$

This composite waveform will be correlated on the receiving side with all 32 product waveforms and two decisions will be made:

(a) A decision as to which set of waveforms has been used.

(b) A decision as to the polarity of the individual waveforms within this set.

The prior knowledge which the receiver can use is (*a*) the fact that for any message only product waveforms will be used, which belong to the same orthogonal set and (*b*) the fact that all of them will be used in every message.

The method described above for the special case of a set with 32 two-factor product waveforms ($m\leq 4$) can be applied in modified form to still larger sets.

*The subset of small band waveforms taken from a complete set of two-factor product waveforms*

If $m$ is large and $n$ is very small in Equation 3, this results in waveforms with a very narrow frequency spectrum. Indeed these are the conventional double-sideband-suppressed carrier signals and their spectrum is essentially limited to a bandwidth of $$\frac{2n\omega_0}{2\pi}=\frac{n}{T}$$

It will be particularly useful to use such a subset over any channel with delay distortions. These are usually rather small over a fraction of the total band, but sizeable over the whole band. Small band waveforms will suffer much less distortion than wide band signals. Any absolute delay difference between the various sub-bands can easily be compensated for in the receiver by adjusting the decision instant separately from sub-band to sub-band (waveform to waveform). Automatic adjustment of the resampling instant at the output of the matched filters in the receiver can therefore be used in place of any more complex automatic phase equalization scheme.

*The subset of wide band waveforms taken from a complete set of two-factor product waveforms*

Whenever $n$ is close to $m$ the frequency spectrum of the waveform will be spread over a frequency band of nearly $2mf_0$. If $m$ is also close to $k$, the wide band waveform will have components up to the extreme ends of the transmission bands. If both, $m$ and $n$ are very large, the spectrum will gradually turn into a line spectrum with one line at the lower end and one line at the upper end of the band.

Such wide band waveforms are desirable in many situations and they are already well known for special applications of signals with very large WT. Here, however, we are primarily concerned with WT from 2 to 20 and with fairly noise free channels, where large sets of non-orthogonal waveforms are desirable.

*The subset of low pass waveforms, generally with DC components taken from a complete set of two-factor waveforms*

The smaller $m$, the larger may be the DC component which a waveform may possess. The extreme case of $n=0$, $m=1$ is a product waveform with unilateral amplitude only. But even in the case $n=3$, $m=4$, there is a a sizeable DC component. Such waveforms may be of great value in channels with direct frequency modulation (video channels) where waveforms with their largest energy in the lower end of the band may be transmitted with a higher modulation index than waveforms with high frequency components. Further, an adaptive system may automatically select such sub-sets of waveforms whenever the channel might require a stronger noise reduction. The peak deviation of the modulator could also be adjusted accordingly.

*The subset of transient waveforms taken from a complete set of two-factor product waveforms*

Examination of the 32 two-factor product waveforms set forth above for the case $m \leq 4$ reveals that, for each choice of a special $m$ and a special $n$ there is one out of four waveforms which starts and ends with its peak value, thus causing a transient at the beginning and the end. While this behavior is normally undesirable, there are applications where such transient waveforms may be desirable for example for synchronization or for special character or word markers.

It is also possible to use a complete set of all waveforms, including the transient waveforms and to let a small gap between any two digits for the build-up and decay of the transient. If $n$ and $m$ of a transient waveform is small, but $k$ is very large (W the bandwidth of the channel is relatively wide), the distortions of transient waveforms will be small enough to put them to good use.

*Subsets of specified "distance" between the waveforms*

If orthogonal waveforms and non-orthogonal waveforms are used in the same system it is advisable to speak of the distance between these signals, making reference to an $n$-dimensional signal space with the orthogonal signals being the dimensions of this space (C. E. Shannon; Communication in the Presence of Noise; Proceedings of the IRE; vol. 37; January 1949; pp. 10–21). Without going deeper into signal theory it may be stressed that the product waveforms offer the possibility to group all available waveforms into subsets of different distance.

The largest distance have signals from the subset of orthogonal waveforms, slightly smaller distance have waveforms which may be termed quasi-orthogonal, which have a very small cross-correlation coefficient. In this manner, subsets of less and less orthogonality can be specified. The exact composition of these subsets has to be computed once M is chosen for any particular data transmission system.

In an adaptive data system is should be possible to add on more and more subsets with smaller and smaller distances between the waveforms whenever the channel transmission characteristics are good, and to drop back to sets with larger distances between the waveforms when the channel turns bad again. An adjustment of all decision thresholds at the outputs of all matched filters at the receiving side must accompany this change in subsets.

*Structure of system using two-factor product waveforms*

A block diagram of a digital communication system employing product waveforms is shown in FIG. 1. The original data is presented to the encoder 1 in either digital or analog form. The encoder 1 serves to encode each elemental portion of the input data into a pulse or group of pulses on the lines connecting the encoder 1 to the product waveform generator 2. These pulses determine which waveform or group of waveforms will be released to the transmitter 4 in any given interval and at which level and polarity for each waveform. The latter decision determines the value of the factor A in Equation 3. In a binary use of the waveforms the values of A will merely be +1 and −1. In single digital operation, or in multiple digital operation, where the set of waveforms is perfectly orthogonal, it is also possible to use the waveforms in a non-binary multi-level mode. The number of levels will naturally be determined by the signal to noise ratio at the receiver.

It will be readily apparent that an encoder having the abovedescribed functional characteristics might easily be constructed by an engineer having ordinary skill in the art.

It is noted that a unitary mastertimer 3 controls both the encoder 1 and the product waveform generator 2. This coaction insures that the pulse outputs from the encoder 1 will be properly synchronized to the product waveforms so as to eliminate, insofar as possible, any discontinuities in the train of product waveforms appearing at the output of the product waveform generator, and to maintain the identifiability of the individual product waveforms at the product waveform detector 6. The specific synchronization requirements will be described in greater detail hereinafter.

The train of product waveforms appearing at the output of the product waveform generator 2 may be introduced directly into the transmission channel if desired. Alternatively, the train of product waveforms may be used to modulate a high frequency carrier. For example, if the particular transmission channel comprises a telephone line, audio frequency product waveforms might be used directly without further modulation. On the other hand, if a radio frequency transmission channel is employed, the train of product waveforms would be used to modulate a radio frequency carrier.

On the receiving side of the system, the product waveform detector 6 uses matched filters or cross-correlators as signal extractors. Such signal extractors secure the well known noise improvement proportional to the time-bandwidth (WT) product of the signal. The product waveform detector 6 additionally includes a decision device responsive to the signal extractors. This decision device must be programmed according to the mode of operation. In single digital operation it must select the highest output of any one of the extractors at the end of a digital interval unless a different decision rule is preferred. In multiple digital operation it must make individual decisions at the outputs of those extractors the waveforms of which are known to participate in the selected mode of operation.

All elements in this system are well known and have been extensively described in the prior art. The waveform generators can consist of oscillators, gates and multiplier circuits, which synthesize any of the selected waveforms according to Equation 3. This technique is well known from analog computers and signal simulators and is particularly easily applicable in this system, as all values of $n$ and $m$ must be integers, securing that all factors of all waveforms are harmonically related. In this case all oscillators will be phase-locked to the master timer and all must have a sine and a cosine output. There will be one multiplier required for each product waveform used in the system.

Another attractive method to generate such waveforms has been described by G. McAuliffe: "Impulsing of Linear Networks in Integrated Data Systems," IRE Transactions on Communication Systems, vol. CS-7, No. 3, September 1959, pp. 189–194. It makes use of the fact that the impulse response of matched filters is the time inverse of the waveform to which they are matched. As all of the waveforms of Equation 3 are either symmetrical or skew-symmetrical, one can use identically the same filters for excitation of waveforms at the transmitter as will be used as matched filters for the extraction of the waveforms at the receiving side. In a semi-duplex operation ("push to talk") it may be profitable to use physically the same filters for both purposes.

The matched filters themselves have been described in prior art and they may be either linear filters with active elements as described by McAuliffe, or use Fourier orthogonal filter techniques as described by Blasbalg: "On the Application of Fourier Orthogonal Filters," Conference Proceedings, East Coast Conference on Aeronautical and Navigational Electronics, October 1958, pp. 165–172. The latter method is particularly attractive as the characteristics of any matched filter can easily be changed by altering the resistance matrices.

Figure 2:
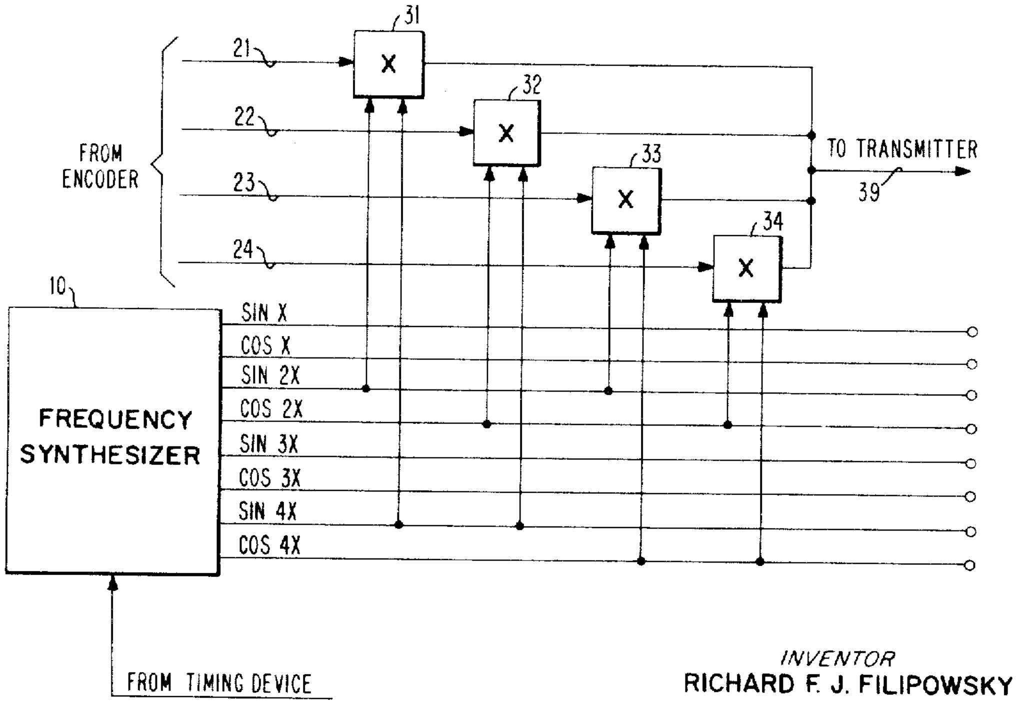
FIG. 2 shows a more detailed block diagram of a two-factor product waveform generator.

A detailed block diagram of the preferred form of the product waveform generator is shown in FIG. 2. It is noted that the preferred manner of generating product waveforms is by means of a frequency synthesizer 10 comprising a plurality of phase-locked harmonic oscillators in combination with a plurality of product modulators 31–34. However, it will be understood that product waveforms may be generated by other means such as, for example, matched filters as mentioned above.

Although only four inputs 21–24 are shown in the preferred form of the product waveform generator, it will be understood that the practice of the subject invention is not limited to any specific number of inputs. For example, for the case $m \leq 4$ as shown in FIG. 2, 32 separate product waveforms may be generated. Hence 32 separate inputs might be profitably utilized. FIG. 2 shows only four inputs 21–24 in order that the principles of the invention may be illustrated in the simplest possible manner.

It is noted that the product waveform generator shown in FIG. 2 is suitable for use in both the single digital and multi-digital modes.

Referring now to the details of the product waveform generator shown in FIG. 2, a frequency synthesizer 10 is provided for the purpose of generating a plurality of harmonically related sinusoids. More particularly, the frequency synthesizer 10 generates both sine and cosine functions of a fundamental frequency and of each harmonic of that fundamental frequency up to and including the fourth harmonic. It should be noted, however, that the practice of the instant invention is not limited to the use of the eight harmonically related sinusoids shown in FIG. 2. Some communication systems will require larger numbers of harmonically related sinusoids, while in others, a smaller number would surface.

The details of construction of a frequency synthesizer of the type described would be readily apparent to one skilled in the art. For instance, a set of phased locked oscillators could be used as described in Chapter 2 of "Radio Transmitters," by Lawrence Gray and Richard Graham (McGraw-Hill, New York, 1961). Another pertinent reference in the frequency synthesis art is "A Survey of Frequency Synthesis Techniques," Milton Baltas, Army Electronics Research and Development Lab., Fort Monmouth, N.J., September 1962 (USAERDL Technical Report #2271).

A plurality of product modulators 31–34 are provided for the purpose of combining the harmonically related sinusoids so as to produce the desired product waveforms. These product modulators 31–34 may be of a conventional type known to those skilled in the art. In analog computers it is common practice to use time division multipliers for highest accuracy. (See for example: E. Kettel and W. Schneider: An Accurate Analog Multiplier and Divider; IRE Transactions on Electronic Computers, vol. EC 10, June 1961, pp. 269–272, containing references to older literature.) Such devices will be useful as product modulators in multi-digital applications of my invention, where highest accuracy of the product waveforms will be required to avoid intersymbol crosstalk. For less critical applications balanced modulators will be useful. (See for example: W. P. Birkemeier and G. R. Cooper: The Balanced Modulator As A Correlator for Random Signals; IRE Transactions Circuit Theory, vol. CT 9, December 1962, pp. 417–419.) Such modulators act as multipliers and produce suppressed carrier amplitude modulation. They have recently been designed with tunnel diodes as non-linear elements. (See: B. Rabinovici, T. Klapper and S. Kallus: Suppressed Carrier Modulations with Tunnel Diodes; Communications and Electronics, vol. 81, July 1962, No. 61, pp. 205–209.) For low frequency applications rectifier modulators are preferable. (See D. P. Howson: Rectifier Modulators, Analysis by Successive Approximations, Electronic Technology, vol. 37, April 1960, pp. 158–162. See also: D. P. Howson and D. G. Tucker: Rectifier Modulators with Frequency-Selective Terminations; Proc. Instn. El. Engrs., Part B, vol. 107, May 1960, No. 33, pp. 261–272.) Each product modulator 31–34 is associated with one of the inputs 21–24 from the encoder 1 shown in FIG. 1. Pulses appearing on the inputs 21–24 from the encoder serve to gate out product waveforms from the associated product modulators 31–34.

In the preferred form, the individual product modulators could be connected to the outputs of the frequency synthesizer by means of a patch board. A patch board would provide the communication system with a measure of flexibility in that it would readily allow different sets of product waveforms to be used. An inspection of FIG. 2 shows that only four of the eight harmonically related sinusoids are actually used to form the four product waveforms. In fact, the eight harmonically related sinusoids are capable of producing a set of 32 unique waveforms each of which is defined by the product of two harmonically related sinusoids as set forth above in the general description of the properties of product waveforms.

The 32 possible product waveforms which may be formed from the eight harmonically related sinusoids can be employed in a number of different ways. For example, in low channel noise conditions, a product waveform generator having 32 inputs from the encoder 1 may be used. In this way all 32 product waveforms can be utilized in a system transmitting in each time interval one waveform out of the set of 32 waveforms. This mode of operation is called the single digital mode. The use of all 32 waveforms in single digital mode is possible because, in low noise conditions, one can rely on slight differences in the correlation factors in order to distinguish the waveforms at the receiver.

On the other hand, when the channel noise level is high, an orthogonal subset of the 32 product waveforms should be chosen. The extremely high distinguishability of the waveforms in an orthogonal subset provides for error free identification of the transmitted waveform at the receiving end in the presence of high noise.

When medium noise levels are encountered, a set of quasi-orthogonal waveforms could be selected from the set of 32. The distinguishability of the quasi-orthogonal waveforms, and, hence, the size of the subset of such quasi-orthogonal waveforms, would be determined by the noise level in the particular channel. More particularly, the correlation of each quasi-orthogonal waveform with the other members of the set of quasi-orthogonal waveforms should be sufficiently low that the expected channel noise could not cause a positive correlation to be indicated when none, in fact, existed.

Still another way of employing the available product waveforms would be to utilize the multi-digital mode of operation. This could be accomplished by wiring the patch board to produce one of the eight subsets of four orthogonal waveforms. Superposition could be achieved by allowing a combination of gating pulses to appear on the input lines 21–24 from the encoder during each time interval rather than the one gating pulse described above. Using the principle of superposition with four orthogonal waveforms, four bits of information could be carried by each composite product waveform. This represents an increase by a factor of two over the information carrying capacity of a communication system using a subset of four product waveforms in the single-digital mode. Naturally, this increase in information carrying capacity is counterbalanced by a requirement for lower noise conditions in order to provide error free performance when the multi-digital mode is employed.

It should be noted at this point that careful synchronization of the product waveform generator is required in order to achieve optimum performance of the communication system. More particularly, two kinds of synchronization are required. First, each of the eight harmonically related sinusoids must be in phase with each other. There must be no relative phase drift between the separate harmonically related sinusoids, and there must be no persistent phase lags or leads. These conditions are required in order to maintain the distinguishability of the waveforms and to eliminate, insofar as possible, discontinuities between the product waveforms in the output product waveform train.

Figure 5:
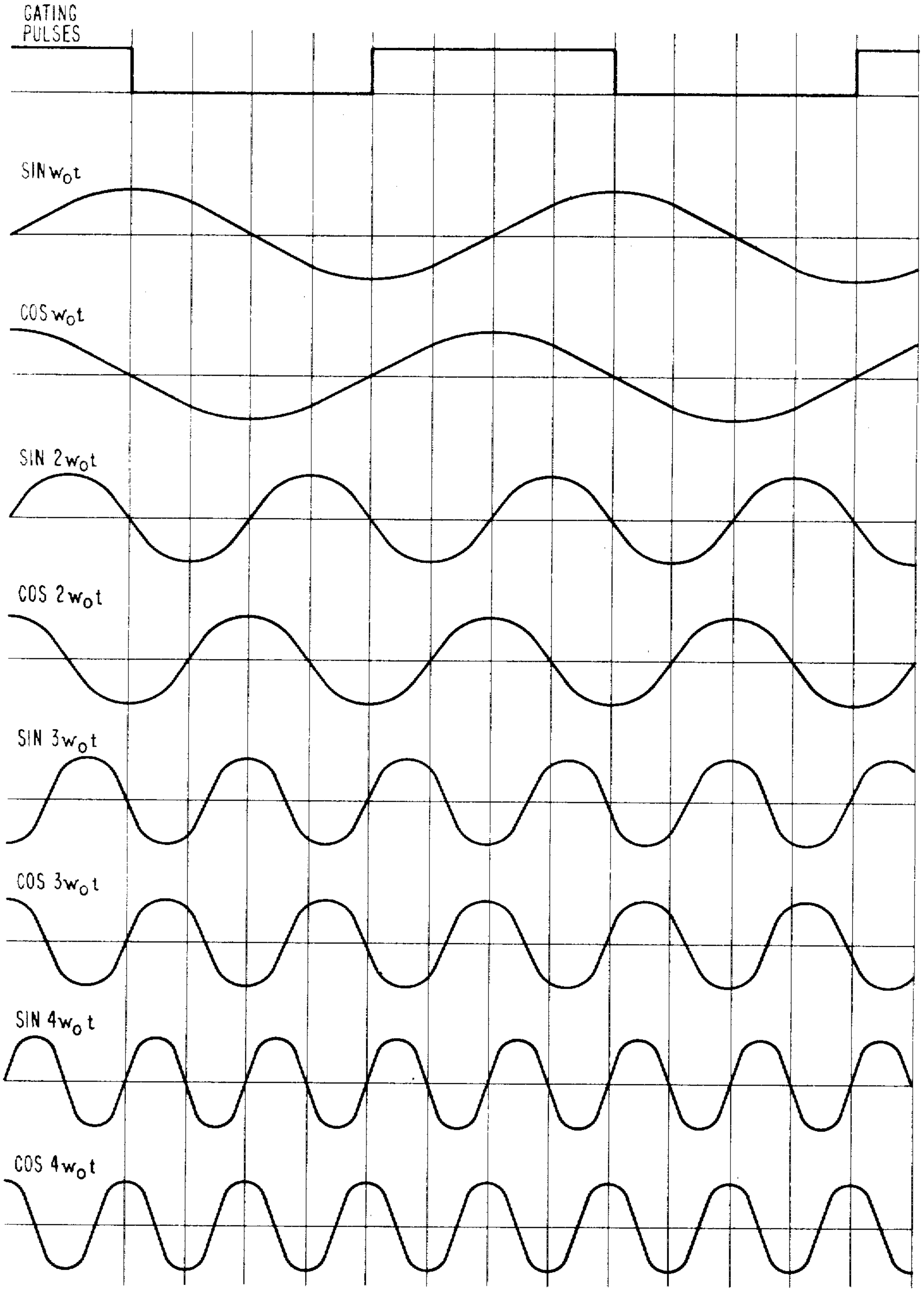
FIG. 5 shows the phase relationship between the harmonically related sinusoids and the gating pulses.

Second, the gating pulses from the encoder must be synchronized with the harmonically related sinusoids in such a way that the product waveform gated out during each time interval starts and ends on the zero axis. This condition will provide for a continuous product waveform train having few discontinuities. In particular, it has been found that gating pulses beginning at a time given by $T(n-1/2)$ and ending at a time given by $T(n+1/2)$ give a set of product waveforms large numbers of which begin and end on the zero axis. ($T$=the period of the fundamental frequency, $n=0, 1, 2, 3 \ldots$). FIG. 5 shows the proper phase relationships between the component harmonically related sinusoids and the gating pulses.

Figure 3:
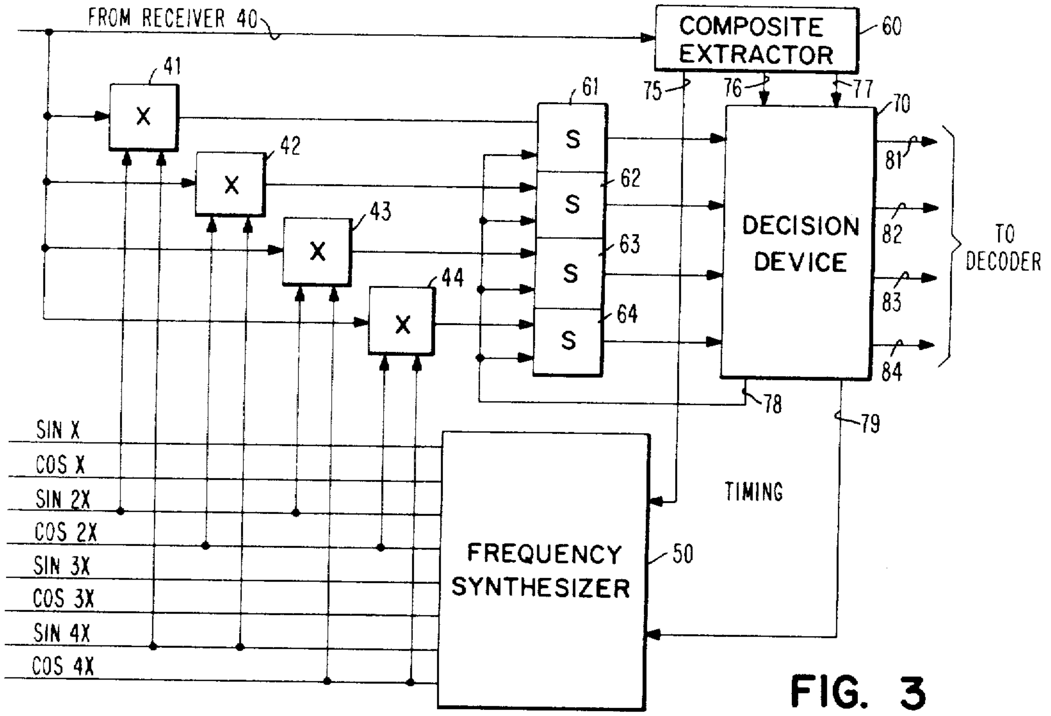
FIG. 3 shows a detailed block diagram of a two-factor product waveform detector adapted for use in a communication system using single digit operation.

Proceeding now to the receiving end of the communication system, FIG. 3 shows a detailed block diagram of a product waveform detector suitable for use in the single-digital mode. Synchronization of the product waveform detector to the incoming train of product waveforms is accomplished by means of a composite extractor 60. Such a composite extractor may be of a type well known in the art. For example, the composite extractor might comprise a full-wave rectifier detecting the deep notches in the envelope of the composite waveform which occur at the beginning or end of all transmission intervals. This is due to the fact that most product waveforms start and end at zero levels. These notches occur with a regular periodicity of 1/T. This repetition rate can be extracted with a flywheel synchronization circuit such as are used in television receivers.

The presence of such notches may be expressed more markedly by the insertion of short synchronization gaps between any two transmission intervals. If amplitude modulation of a carrier signal is contemplated, the carrier may be keyed to zero level during the synchronization gaps, while care may be taken that the negative peaks of the composite waveform may never reach down the zero carrier level. This system gives clear synchronization pulses after envelope detection which may be easily separated from the product waveforms by simple clipper circuits. This method is the well known synchronization pulse separation method of conventional television broadcasting methods. (See for example: A. V. T. Martin, Technical Television, Prentice Hall, 1962, or S. W. Amos and D. C. Birkinshaw, Television Engineering, Principles and Practice; Iliffe Books Ltd., London, 1962.)

The output from the composite extractor is fed into the frequency synthesizer 50 on line 75 in order to control the phase of the synthesizer output with respect to the incoming train of product waveforms. The frequency synthesizer 50 produces a set of eight harmonically related sinusoids identical to the sinusoids produced in the frequency synthesizer 10 shown in FIG. 2. Selected ones of the set of harmonically related sinusoids are patched into the multipliers 41–44 so as to produce the same set of product waveforms that are produced by multipliers 31–34 shown in FIG. 2. During each time interval the received product waveform is multiplied with each of the product waveforms by means of multipliers 41–44. The outputs from multipliers 41–44 are integrated over the time interval by means of integrators 61–64 connected to the ouput from each multiplier 41–44. The outputs from the integrators 61–64 are then compared in the decision device 70 which serves to determine the largest output.

Where orthogonal product waveforms are employed and low channel noise conditions exist only one integrator will produce an output, and the outputs from the other integrators will be zero. Under these conditions, the job of decision device 70 is simple. However, where the waveforms are only quasi-orthogonal or where significant amounts of channel noise are present, each of the integrators 61–64 will produce an output pulse during each time interval. Only the largest of these pulses will correctly identify a received product waveform. Therefore, a largest-of-$m$-decider is required in order to determine which of the pulses is the largest and pass only that pulse to the decoder. Largest-of-$m$-deciders are well known in the art. For example, U.S. Patent 2,815,448 of the present inventor discloses an auction circuit which performs the functions of the largest-of-$m$-decider shown in FIG. 3. An additional reference is "A Limit for Probability of Error for Largest of Selection," by Frank G. Splitt, IEEE Trans. Commun. Syst., vol. CS–11, December 1963, pp. 494–496.

In some situations it might be found desirable to employ a maximum likelihood decider in place of the largest-of-$m$-decider 70 shown in FIG. 3. Maximum likelihood deciders are discussed in "Introduction to Statistical Communication Theory," Dave Middleton, McGraw Hill, New York, N.Y., 1960. Under certain symmetrical operating conditions a maximum likelihood decider becomes identical to a largest-of-$m$-decider.

It is noted that decision device 70 receives control inputs 76 and 77 from composite extractor 60. Control input 76 serves a timing function. More specifically, control input 76 serves to place the decision instant exactly at the end of each received waveform. Control input 77 serves to adjust the decision threshold of decision device 70 in order to compensate for variations in the power of the received signal due, for instance, to transmission channel attenuation.

It is further noted that decision device 70 produces control outputs on lines 78 and 79. Output 79 carries signals for updating the timing of frequency synthesizer 50. Such signals may be derived from a means for sensing the exact location of the correlation peaks on an average basis. This peak sensing function may be accomplished by means of a differentiator and a zero crossing indicator. Output 78 serves to discharge or clear the integrators 61–64 after each decision is made by decision device 70.

Figure 4:
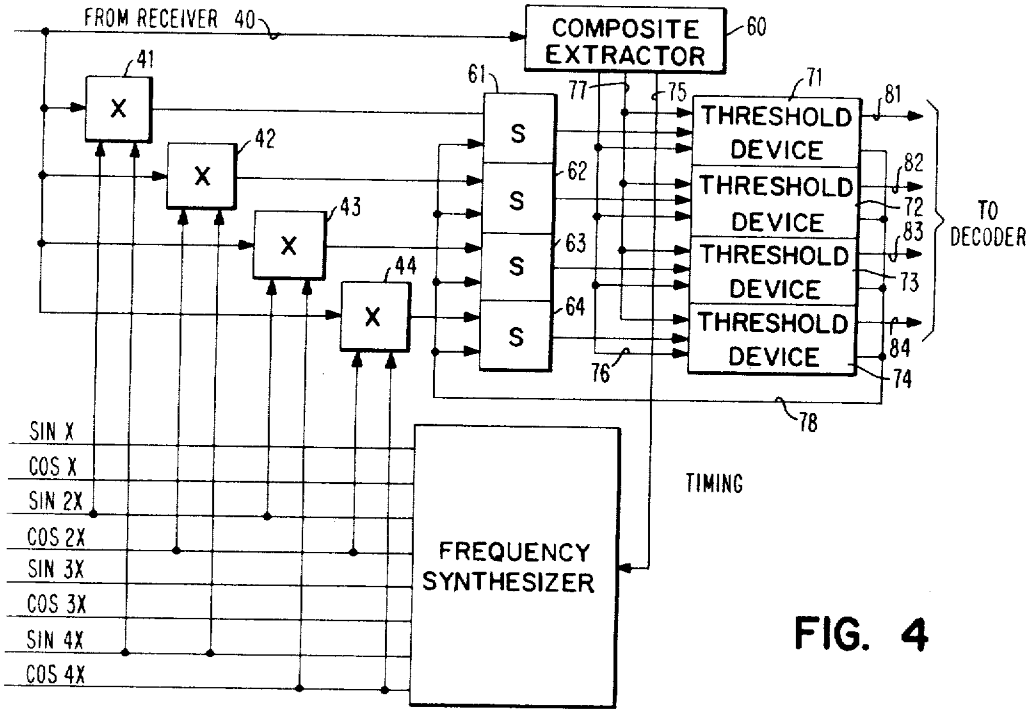
FIG. 4 shows a detailed block diagram of a two-factor product waveform detector adapted for use in a communication system multi-digit operation.

FIG. 4 shows a product waveform detector adapted for use in the multi-digital mode. The structure of this form of product waveform detector is the same as that shown in FIG. 3 except that the largest-of-$m$-decider 70 shown in FIG. 3 is replaced by individual threshold devices 71–74 at the output of each integrator 61–64. If, at the end of a transmission interval the output from any of the integrators 61–64 exceeds the threshold level of its associated threshold device 71–74, a pulse will be produced at the output 81–84 of the threshold device. The output from the composite extractor 60 makes the necessary adjustments in the threshold levels during each transmission interval.

Threshold devices such as they are used in FIG. 6, 71–74, are well known in the art. Indeed a whole new branch of switching theory is based on such devices. (See for example: H. F. Klock, G. D. Kraft and R. D. Haney: Logic of Controlled Threshold Devices; NASA document N63–16944, Case Institute of Tech., Cleveland, Ohio, December 1962.) The practical circuits use TRL (transistor-resistor-logic) techniques (See: W. T. Wray, Jr.: Worst Ease Design of Variable Threshold TRL Circuits, IRE Trans. Electronic Computers, vol. EC 11, June 1962, pp. 382–390) or they use tunnel diodes. (See for example: G. A. Rogers: A Base Clipping Technique Using Tunnel Diodes, with Automatic Adjustment of Clipping Level, Report RRE TN 704, Royal Radio Establishment, Malvern, England, July 1963, ASTIA document AD 424003).

*Operation of system using two-factor product waveforms*

The principles of operation of my invention may be best understood by reference to the operation of a specific communication system utilizing my invention. For example, referring to FIG. 1, let us assume that the input information is in the form of a train of amplitude modulated pulses. Further, let us assume that the particular encoder 1 serves to quantize each pulse into one of four possible levels. Hence, for each amplitude modulated pulse that appears at the input to the encoder 1, a gating pulse appears on the one of the four outputs of the encoder 1 which corresponds to the particular amplitude level of the input pulse. For example, assume that a gating pulse appears on line 23 of the product waveform generator shown in FIG. 2. Such a gating pulse would cause a product waveform corresponding to waveform C shown in FIG. 6 to appear at the output of multiplier 33 shown in FIG. 2. This waveform would then be introduced into the transmission channel for transmission to the receiving apparatus.

At the receiving apparatus, the received product waveform is applied to the inputs of each of the multipliers 41–44. The other inputs to the multipliers comprise combinations of harmonically related sinusoids selected so as to form product waveforms corresponding to those shown in FIG. 6. Since the received product waveform corresponds to waveform C shown in FIG. 6, only the output from multiplier 43 will be positive over the entire time interval over which the received waveform is multiplied with each of the locally generated product waveforms. The outputs from the other multipliers 41, 42 and 44 will assume both positive and negative values over the same time interval. As a result, the output from integrator 63 will have a large positive value at the end of the time interval. On the other hand, the output from integrators 61, 62, and 64 will have zero value in the case of orthogonal waveforms and no channel noise, and either positive or negative values of low absolute value in the case of quasi-orthogonal waveforms and/or channel noise.

In the largest-of-*m*-decider 70 the outputs from the integrators are compared and the output from integrator 63 is identified as the largest. Correspondingly output 83 of largest-of-*m*-decider 70 is activated during this time interval. The decoder 7 operates to transform this information into any desired form. For example, it may be desired to convert this information back into a train of amplitude modulated pulses corresponding to the original input train. Alternatively, it might be found desirable to convert this information to pulse position modulated information, frequency modulated information, analog information, etc. Any of these decoding functions can be performed by decoders which are well known in the art.

An alternative communication system might operate in the multi-digital mode utilizing the principle of superposition of orthogonal waveforms. For example, assume that the original input data is in the form of serial binary coded decimal digits. Given this input, the encoder 1 shown in FIG. 1 would perform the function of a serial to parallel converter. During each time interval, a combination of gating pulses would appear on the inputs 21 through 24 to the product waveform generator shown in FIG. 2. For example, suppose that during a particular time interval gating pulses appear on lines 22 and 24, corresponding to the BCD representation of the decimal digit 5. In this case product waveforms corresponding to waveforms B and A would appear at the outputs of multipliers 32 and 34 respectively. These waveforms would be superposed to form a composite waveform at the output 39. This composite waveform would then be introduced into the transmission channel. At the receiving apparatus the received composite waveform would be introduced into the product waveform detector on line 40 shown in FIG. 4. The received composite of the two product waveforms is then introduced to each of the multipliers 41–44. The other inputs to the multipliers 41–44 are combinations of harmonically related sinusoids selected so as to form product waveforms corresponding to those shown in FIG. 6. During the time interval over which the waveforms are multiplied, the outputs from multipliers 42 and 44 should be predominantly positive, whereas the outputs from multipliers 41 and 43 should be both positive and negative. As a result, the outputs from integrators 62 and 64 should have very large positive values at the end of the time interval. On the other hand, the outputs from integrators 61 and 63 will be of low absolute value and may be either positive or negative in polarity. The large values of the outputs of integrators 62 and 64 should exceed the threshold values of threshold devices 72 and 74 causing them to produce output pulses. On the other hand, the low values of the outputs from integrators 61 and 63 should not exceed the threshold values of threshold devices 71 and 73, hence threshold devices 71 and 73 would produce no output pulses. It is noted that a threshold adjusting device responsive to the magnitude of the composite signal is required in order to adjust the individual threshold levels of the threshold devices 71–74 because, if a large number of product waveforms form the composite waveform, the composite waveform will be of large magnitude. This large magnitude may cause a spuriously high output from one of the integrators 61–64 when no correlation is actually desired. Hence, it is desirable to raise the threshold levels of the individual threshold devices when the magnitude of the composite waveform is large.

The outputs from the individual threshold devices are applied to the decoder 7 shown in FIG. 1. In the particular communication system described, it might be found desirable that the decoder perform the function of a parallel to serial converter so as to convert the received information back into a series of binary coded decimal digits corresponding to the form of the original input data.

In the foregoing description of both the single-digital and multi-digital communication systems, it is noted that a product waveform is transmitted in the positive sense when a binary 1 appears at one of the inputs 21–24 of FIG. 2. When a binary 0 appears, no waveform is transmitted. Another mode of operation involves the transmission of product waveforms in both positive and negative senses. This mode of operation is sometimes called the bi-orthogonal mode.

One example of the bi-orthogonal mode of operation comprises the transmission of a product waveform in the positive sense when a binary 1 appears at its associated input, and the transmission of the same product waveform, but with its polarity reversed, when a binary 0 appears at the input. If this mode of operation is to be used, certain modifications of the product waveform detectors might be desirable. For example, in the product waveform detector shown in FIG. 4, threshold devices 71–74 might be provided with means for sensing both positive and negative threshold levels. For example, if the output from one of the integrators 61–64 exceeds the positive threshold level, a binary 1 is indicated. If the output from the integrator exceeds the negative threshold level, then a binary 0 is indicated. If neither threshold is exceeded then an error is indicated. This type of decision is called null-zone decision and is well known in the art.

The product waveform detector shown in FIG. 3 may be adapted for bi-orthogonal null-zone decision by providing decision device 70 with a largest-of-*m*-decider for detecting and indicating which of the positive outputs from the integrators 61–64 is of the largest magnitude, and a second largest-of-*m*-decider for detecting and indicating which of the negative outputs from the integrators 61–64 is of the largest magnitude. In addition decision device 70 would be provided with a threshold device so that no output would be produced on lines 81–84 unless the magnitude of one of the outputs from integrators 61–64 exceeds a predetermined threshold level.

In order to render the system more noise resistant the composite extractor may contain a noise measuring device, which can be a simple integrating and gated voltmeter which will determine the average value of the envelope of the received signal during the periods between the digital intervals, when the information signal should have minimum power or when intentional gaps may have been inserted. During these intervals the received signal will consist primarily or exclusively of noise. This measure of the noise, integrated over a sufficiently long period, may be used to adjust the threshold of the decision device in a manner which may cause the system to miss a signal, rather than to indicate erroneously a signal which has not been transmitted. This threshold adjustment may be particularly useful in the above-described bi-orthogonal mode of operation where a failure to decide the polarity of a waveform is immediately an indication of faulty operation.

In another example of the bi-orthogonal mode of operation, each product waveform can be made to carry a ternary digit of information rather than a binary digit. More specifically, in FIG. 2, each of the input lines 21–24 may assume any one of three states: +1, 0, −1. In response to a +1 input, the associated multiplier produces an output product waveform having positive polarity. In response to a −1 input, the associated multiplier produces the same product waveform but with its polarity reversed. In response to a 0 input, the associated multiplier produces a zero output. At the receiver, null-zone decision is used. If the output from a particular integrator is greater than a certain positive threshold a +1 is indicated. If the output of the integrator is less than a certain negative threshold a −1 is indicated. If neither threshold is exceeded a 0 is indicated.

*Multiple-factor product waveforms*

Higher order product waveforms containing three or more component factors possess certain advantages over the second order product waveforms described hereinabove. These advantages are set forth generally in the following discussion of the properties of the various subsets of higher order product waveforms, and, more particularly, with reference to a digital communication system using such higher order product waveforms.

*The subset of orthogonal waveforms*

The most important subsets of the higher order product waveforms are the orthogonal subsets. It has been shown above that second order level four product waveforms offer eight subsets of four orthogonal waveforms each. Subsets C and G are of particular interest because of their very regular structure.

Figure 10:
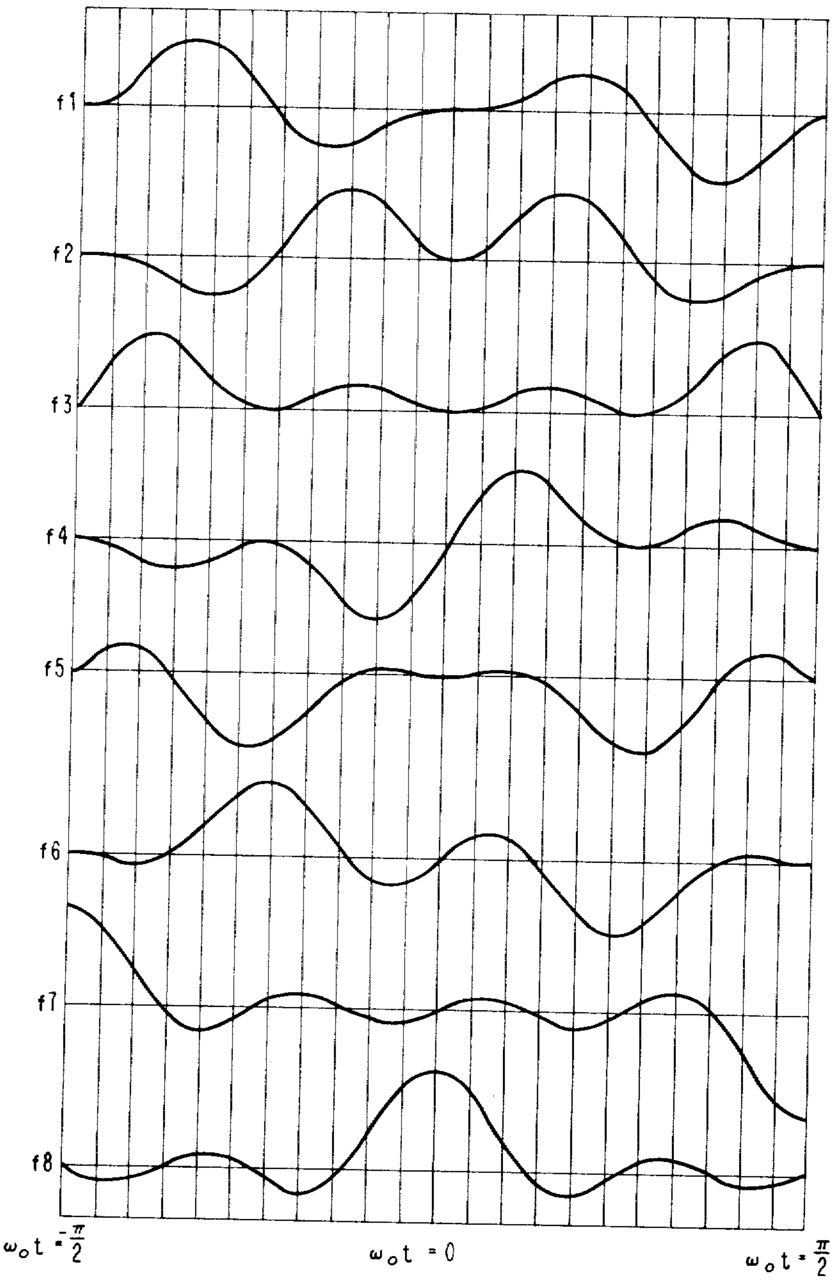
FIG. 10 shows time functions of an orthogonal subset of multiple-factor product waveforms.
Figure 11:
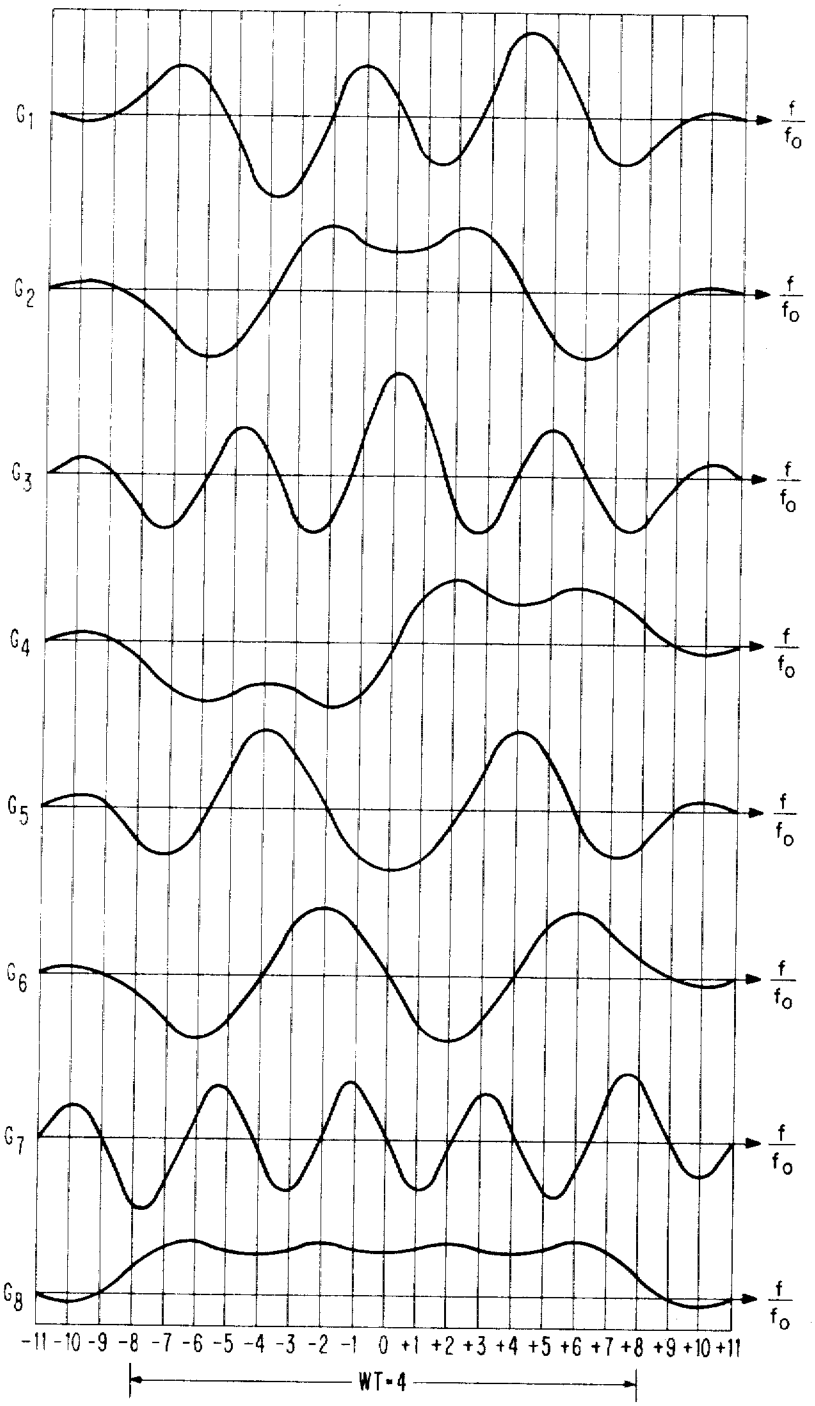
FIG. 11 shows the Fourier spectra of the set of orthogonal waveforms shown in FIG. 10.

Unfortunately, however, not all members of the one set are orthogonal to all members of the other set. This difficulty can be overcome by combining the two subsets so as to form a subset of product waveforms of higher order. The most regular orthogonal set of third order is apparently the following set of 8 waveforms:

sin X·sin 2X·sin 4X
cos X·sin 2X·sin 4X
sin X·cos 2X·sin 4X
cos X·cos 2X·sin 4X
sin X·sin 2X·cos 4X
cos X·sin 2X·cos 4X
sin X·cos 2X·cos 4X
cos X·cos 2X·cos 4X FIG. 10 shows all the eight time functions of this set and FIG. 11 shows the Fourier spectra of all 8 waveforms. Both the time functions and the spectra indicate the orthogonality of each waveform with respect to each other waveform. Orthogonality, in this case, is defined by the following expression:

$$\int^{+\frac{\pi}{2}} f_i(\omega_0 t)\cdot f_j(\omega_0 t)\,d(\omega_0 t)=0$$

for all $$i\neq j-\frac{\pi}{2}$$

The WT product of the members of the above set is not equal for all members. To permit the evaluation of the WT product, the power spectrum of each of the eight waveforms is plotted in the FIG. 12. Any definition of the WT product must be combined with a definition of the energy which is permitted to remain outside the WT limits. This energy either causes cross-talk over into other channels, or the suppression of this energy by filters causes distortions of the waveforms with a resulting reduction in detectability. The energy outside the WT limits should therefore generally be made as small as possible. Design specifications will, however, vary from application to application. Therefore, Table 2 lists the WT product for each of the 8 waveforms for a number of different allowable percentages of "spurious energy."

| | 2% | 4% | 6% | 8% | 10% | 15% |
|---|---|---|---|---|---|---|
| $f_2$ cos X·sin 2X·sin 4X | 3.85 | 3.68 | 3.57 | 3.50 | 3.43 | 3.28 |
| $f_6$ cos X·sin 2X·cos 4X | 3.85 | 3.68 | 3.57 | 3.50 | 3.43 | 3.28 |
| $f_4$ cos X·cos 2X·sin 4X | 3.95 | 3.72 | 3.60 | 3.52 | 3.45 | 3.34 |
| $f_8$ cos X·cos 2X·cos 4X | 3.95 | 3.72 | 3.60 | 3.52 | 3.45 | 3.34 |
| $f_1$ sin X·sin 2X·sin 4X | 4.16 | 3.86 | 3.82 | 3.74 | 3.64 | 3.42 |
| $f_5$ sin X·sin 2X·cos 4X | 4.18 | 3.92 | 3.86 | 3.78 | 3.70 | 3.48 |
| $f_3$ sin X·cos 2X·sin 4X | 4.82 | 4.08 | 3.96 | 3.88 | 3.78 | 3.62 |
| $f_7$ sin X·cos 2X·cos 4X | 8.4 | 7.4 | 6.8 | 6.7 | 5.8 | 5.2 |

It can be seen that even under the most conservative design, which tolerates only 2% of spurious energy, there are 4 of the 8 waveforms with a WT product below 4. Indeed, there is only one of the 8 waveforms which exceeds the $WT=4$ limit by a wide margin. If a more liberal 10% of spurious energy can be permitted, one can see that 7 of the 8 waveforms can be accommodated within $WT=3.78$. This gives a set of 1.85 WT orthogonal waveforms, which comes very close to the theoretical limit of 2WT. It will be explained later how, nevertheless, full use can be made of this 8th waveform which, in its truncated form, shows a larger WT product than the others.

*The subset of pass band product waveforms*

Figure 12:
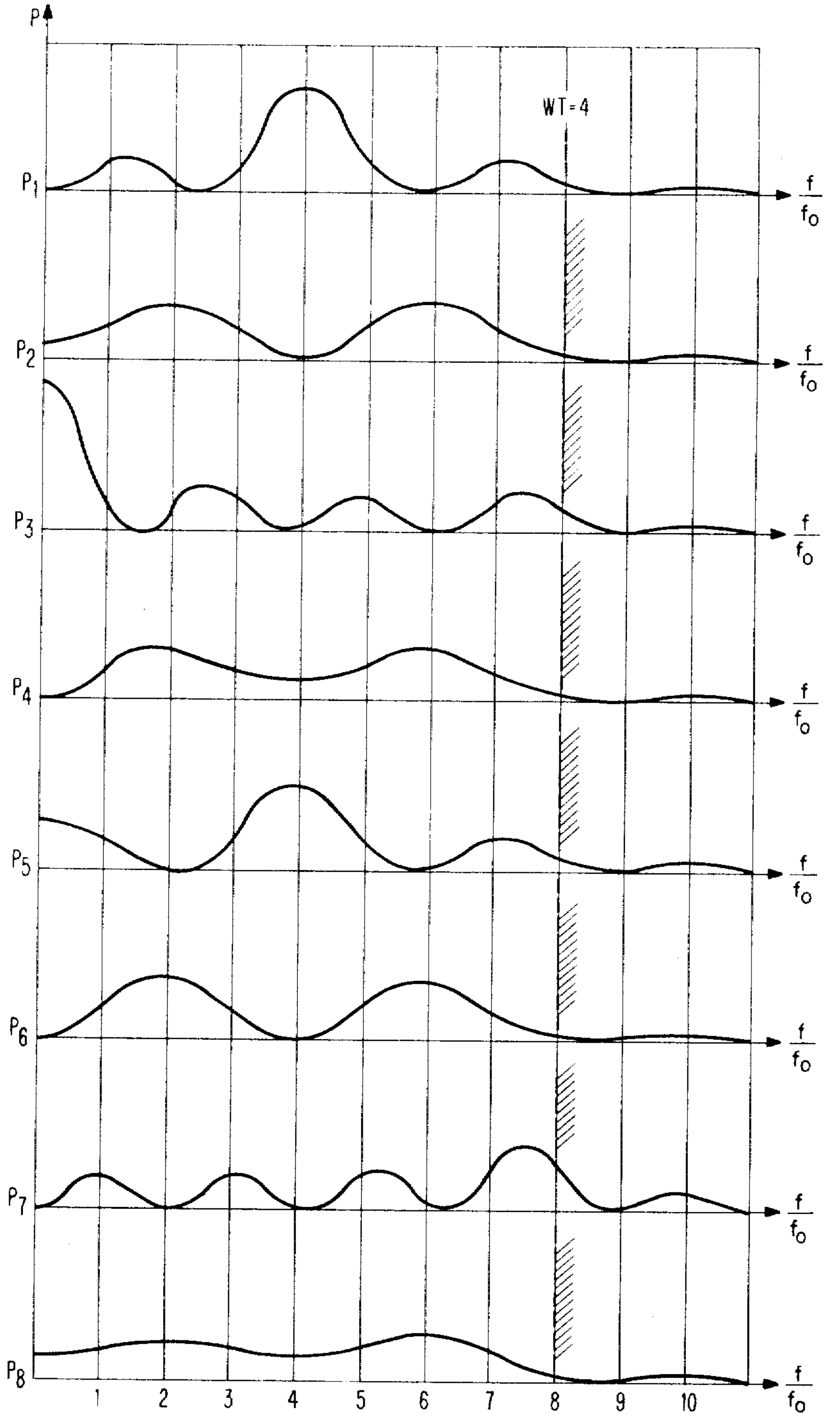
FIG. 12 shows the power spectra of the set of orthogonal waveforms shown in FIG. 10.

It can be seen from FIGS. 10, 11, and 12 that 4 of the 8 waveforms of the basic orthogonal set of third order waveforms have DC components, i.e., their frequency spectra do not go to zero spectral density at very low frequencies. Such waveforms with DC components are difficult to handle in certain types of communications channels. For example, the ordinary type of telephone channel (voice channel) will transmit all frequencies between about 400 c.p.s. and 2800 c.p.s. well, but cannot handle a DC component and will inflict heavy distortions to frequency components below 300 c.p.s.

Figure 13:
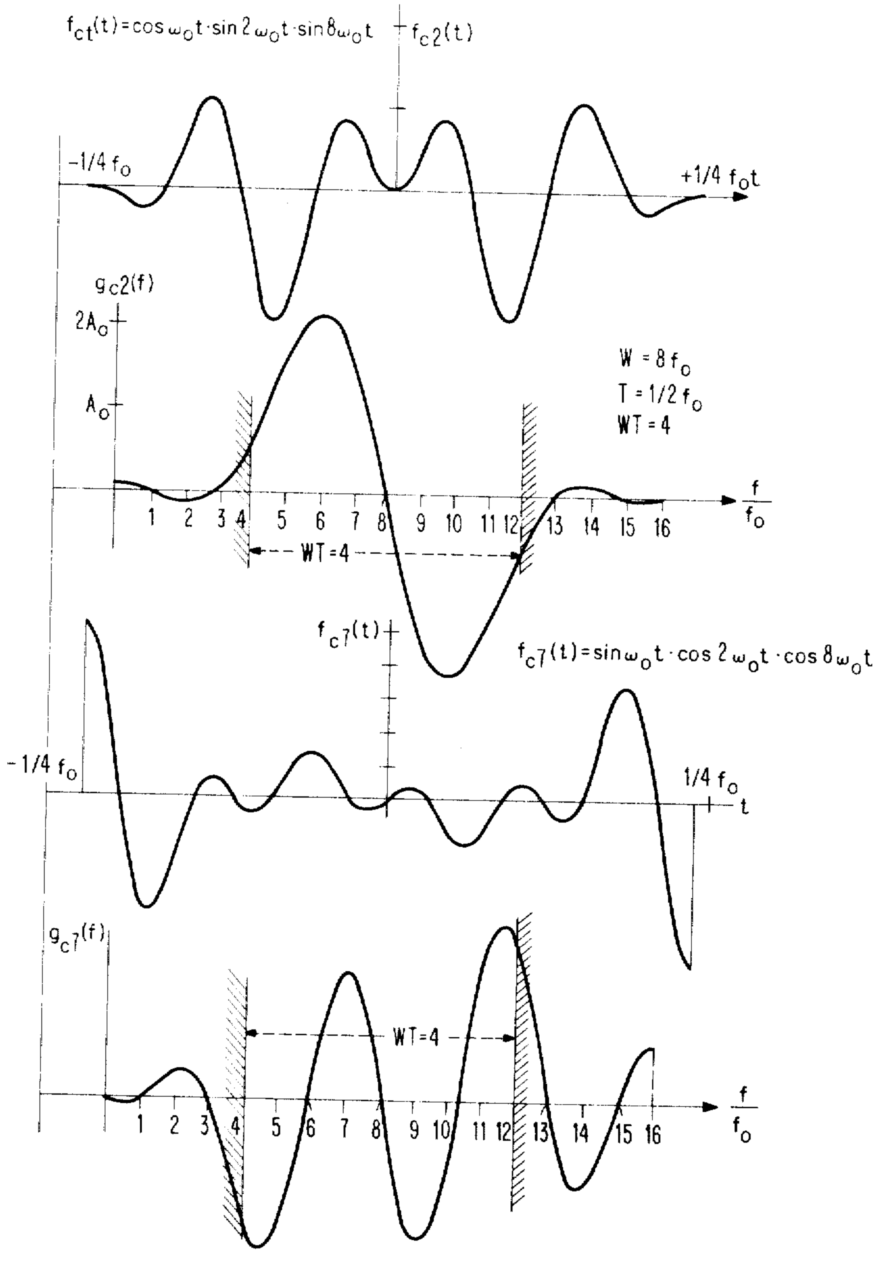
FIG. 13 shows two examples of orthogonal pass band waveforms and their spectra.

FIG. 13 shows that other subsets of the complete sets of multiple factor product waveforms offer the advantage of practically DC-free waveforms, while retaining all the other advantages of a given subset of product waveforms. To demonstrate this particular advantage of my invention I have selected the above-mentioned basic orthogonal subset of third order. By raising this set from its basic class 4 to class 8, it is possible to retain the same WT product for all waveforms, but to reduce all DC components to a negligible value.

The orthogonal set of third order, when raised to class 8, has the following 8 waveforms with their functional symbols:

$f_{c1}(t)=\sin\ \omega_0 t\cdot\sin\ 2\omega_0 t\cdot\sin\ 8\omega_0 t\ .\ .\ .\ f_{3,8,1}$
$f_{c2}(t)=\cos\ \omega_0 t\cdot\sin\ 2\omega_0 t\cdot\sin\ 8\omega_0 t\ .\ .\ .\ f_{3,8,2}$
$f_{c3}(t)=\sin\ \omega_0 t\cdot\cos\ 2\omega_0 t\cdot\sin\ 8\omega_0 t\ .\ .\ .\ f_{3,8,3}$
$f_{c4}(t)=\cos\ \omega_0 t\cdot\cos\ 2\omega_0 t\cdot\sin\ 8\omega_0 t\ .\ .\ .\ f_{3,8,4}$
$f_{c5}(t)=\sin\ \omega_0 t\cdot\sin\ 2\omega_0 t\cdot\cos\ 8\omega_0 t\ .\ .\ .\ f_{3,8,5}$
$f_{c6}(t)=\cos\ \omega_0 t\cdot\sin\ 2\omega_0 t\cdot\cos\ 8\omega_0 t\ .\ .\ .\ f_{3,8,6}$
$f_{c7}(t)=\sin\ \omega_0 t\cdot\cos\ 2\omega_0 t\cdot\cos\ 8\omega_0 t\ .\ .\ .\ f_{3,8,7}$
$f_{c8}(t)=\cos\ \omega_0 t\cdot\cos\ 2\omega_0 t\cdot\cos\ 8\omega_0 t\ .\ .\ .\ f_{3,8,8}$ Two of these waveforms are shown in FIG. 13. $f_{c2}(t)$ is the class 8 version of the waveform $$f_2(t)=\cos\ \omega_0 t\cdot\sin\ 2\omega_0 t\cdot\sin\ 4\omega_0 t$$

which has a sizeable DC component, as may be seen in FIGS. 10, 11 and 12. The Fourier spectrum $g_{c2}(f)$ in FIG. 13 indicates a negligibly small DC component, which would go to virtually zero if the waveform were raised to a still higher class, as for example, class 12, 16 or 20. FIG. 13 also shows that the largest part of the frequency spectrum of $g_{c2}(f)$ is the same as the spectrum of $G_2$ in FIG. 11, except that the principal cross-over (i.e., the virtual carrier frequency) has been shifted from $4f_0$ to $8f_0$. However, the bandwidth of the waveform has not changed significantly, and accordingly, its WT value is still close to 4. Even the polarity of the Fourier spectrum has remained the same, with components in the lower sideband of the virtual carrier having positive polarity and components in the upper sideband having negative polarity.

The other waveform in FIG. 13 is the class 8 version of the waveform $f_7(t)$, which, in the basic orthogonal set of third order, is the one with the large WT product. It is interesting to note that raising this waveform to a carrier band serves to emphasize the pulsive character of the waveform. The discontinuity of the waveform at the limits of the time interval are more pronounced than in the basic set. Accordingly, the WT product will again be much larger than that of the other seven orthogonal waveforms.

From these examples it can be seen that, having decided on a set of suitable base-band waveforms, it is easy to select an equivalent set of carrier band waveforms. The only necessary change is to provide that the highest harmonic factor is of a much higher frequency than the highest frequency in the base-band set. If the total number of factors in a product waveform does not change, then, by definition, the carrier-band waveforms have the same order as the corresponding base-band waveforms. Their class has merely been raised. In order to retain the essential characteristics of all waveforms in a set, such as, for example, their orthogonality, it is necessary to make the frequency of the highest term in the carrier-band case an integer multiple of the highest frequency in the base-band case. In other words, the new class number should be an integer multiple of the old class number, Naturally this does not exclude the possibility of generating any desired set of carrier-band waveforms by selecting as the new highest frequency term any suitable integer multiple of the fundamental frequency of a set. However, it will be advisable to investigate the characteristics of the new carrier-band set independently of the characteristics of the corresponding base-band set.

*The subset of wide-band waveforms*

Another interesting set of waveforms is the set of waveforms which have a rather uniform frequency spectrum, i.e., those which display a noise-like character. My product waveforms contain subsets of such noise-like waveforms which are simple to generate. Such noise-like waveforms are known to provide extremely efficient utilization of the communication channel. For example, the waveform $f_8=\cos\ \omega_0 t\cdot\cos\ 2\omega_0 t\cdot\cos\ 4\omega_0 t$ shown in FIG. 10 has a practically flat frequency spectrum ($G_8$ in FIG. 11). This observation can be generalized by stating that the highest ranking waveform in each basic orthogonal set has the flattest possible spectrum. There are waveforms in other sets with similar characteristics, but they must be selected on an individual basis.

*The subset of small-band waveforms*

Small-band waveforms also comprise a special subset of my product waveforms. These waveforms are special subsets of the pass-band waveforms and, in general, it can be said that they occur when the class of a waveform is much higher than its order and when all terms of Equation 1, but the last one, have the smallest possible $k$ indices, i.e., if all but one frequency of the multiple factors are the lowest harmonics of the fundamental frequency. For example, $f_{4,16,1}=\sin\ \omega_0 t\cdot\sin\ 2\omega_0 t\cdot\sin\ 3\omega_0 t\cdot\sin\ 16\omega_0 t$ is a typical small-band waveform. The highest term defines the center of the small carrier band and the next term to the left determines in general the bandwidth of the small carrier band. According to this rule it can be stated that the lowest ranking waveforms of a suitable class and order of my product waveforms will be the waveforms having the smallest frequency band within this class and order.

Figure 7:
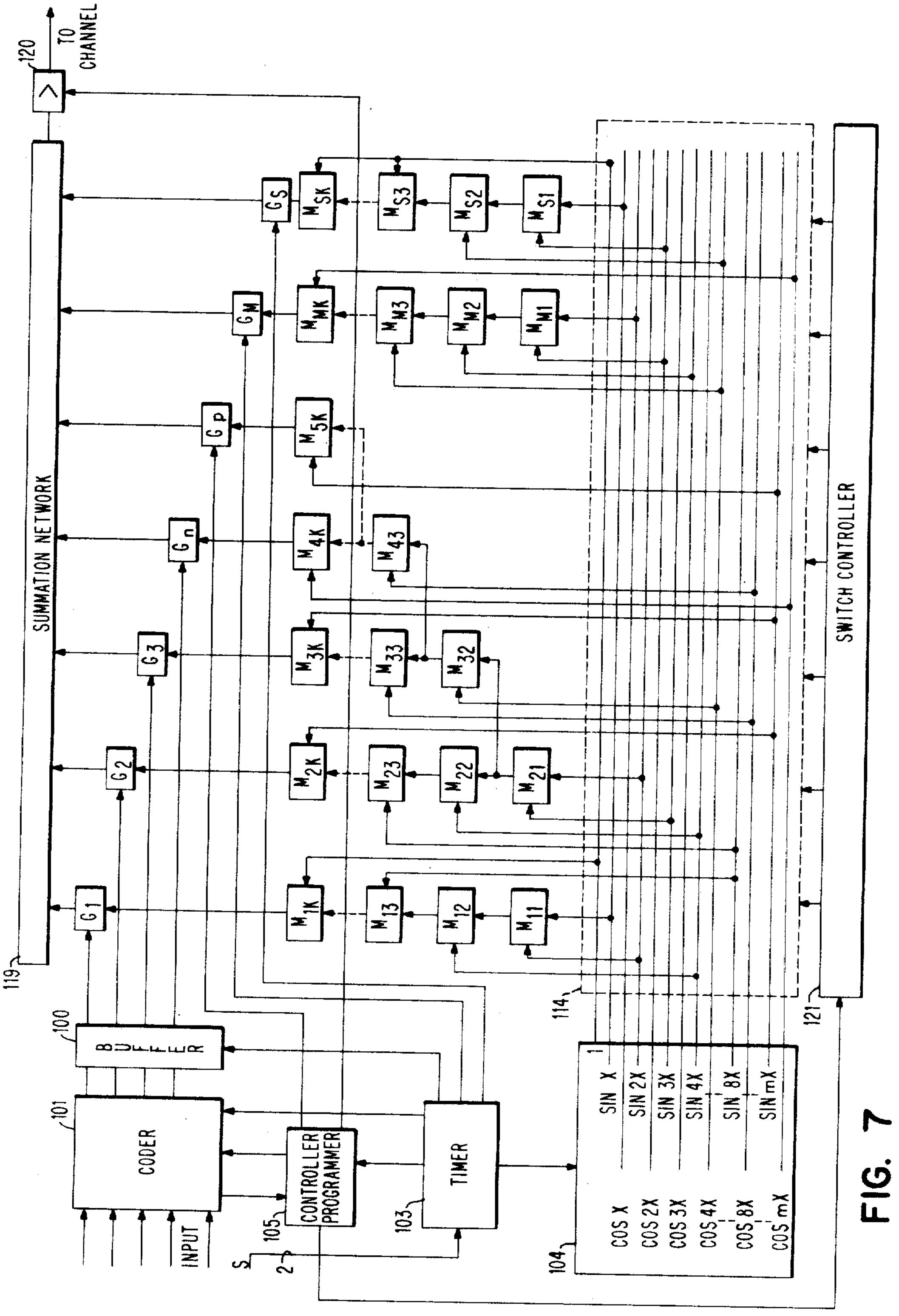
FIG. 7 shows a detailed block diagram of the transmitting station of a digital communication system using multiple-factor product waveforms.

Notice that the subset of small-band product waveforms is closely related to the double side-band suppressed carrier waveforms of the prior art, except that in my product waveform, the carrier is an integral part of the waveform in absolute phaselock with all other terms. The waveforms are directly generated by a circuit as shown in FIG. 7 without the need for a separate carrier oscillator and modulator. The output of this waveform generator is directly the equivalent to the modulated waveform of the prior art. The generating of small-band product waveforms according to my invention has the additional advantage that a simple cross-correlation receiver, such as the one shown in FIG. 2, can be used as a detector without the need for special demodulator, as required by the transmission systems of the prior art. If the center frequency of the transmission band is at extremely high frequencies, for example in the microwave range, it will be advisable to generate the small-band product waveforms in a suitable intermediate frequency band and to convert them to the microwave band by conventional frequency converters. Similarly, the receiver correlator will operate with small-band product waveforms in the intermediate frequency range.

*The subset of pulsive or transient waveforms*

A number of examples shown in the various figures indicate that there are certain subsets of product waveforms which show a marked pulsive or transient character. Such is the case with waveforms 4 and 8 in FIG. 9. It is clear that a waveform with all cosine terms has a relatively high value at $t=0$, but the distribution of the energy over the rest of the interval depends on the number and the frequencies of all the cosine terms. If one or more of the factors are sine factors, the value at the center of the waveform is reduced to zero. This, however, does not exclude the possibility of a pulsive character at other places in the interval, as shown by waveform 8 in FIG. 9 ($f_{4,8,24}$) which has two sine and two cosine terms. Beyond such general rules it is necessary to select transient waveforms on an individual basis.

The above discussion demonstrates, by way of a few examples, that my multiple factor product waveforms have a number of desirable characteristics which make them suitable as information carriers. The following is a description of a preferred embodiment of a communications system which utilizes multiple factor product waveforms.

*Structure of system using multiple-factor product waveforms*

Figure 8:
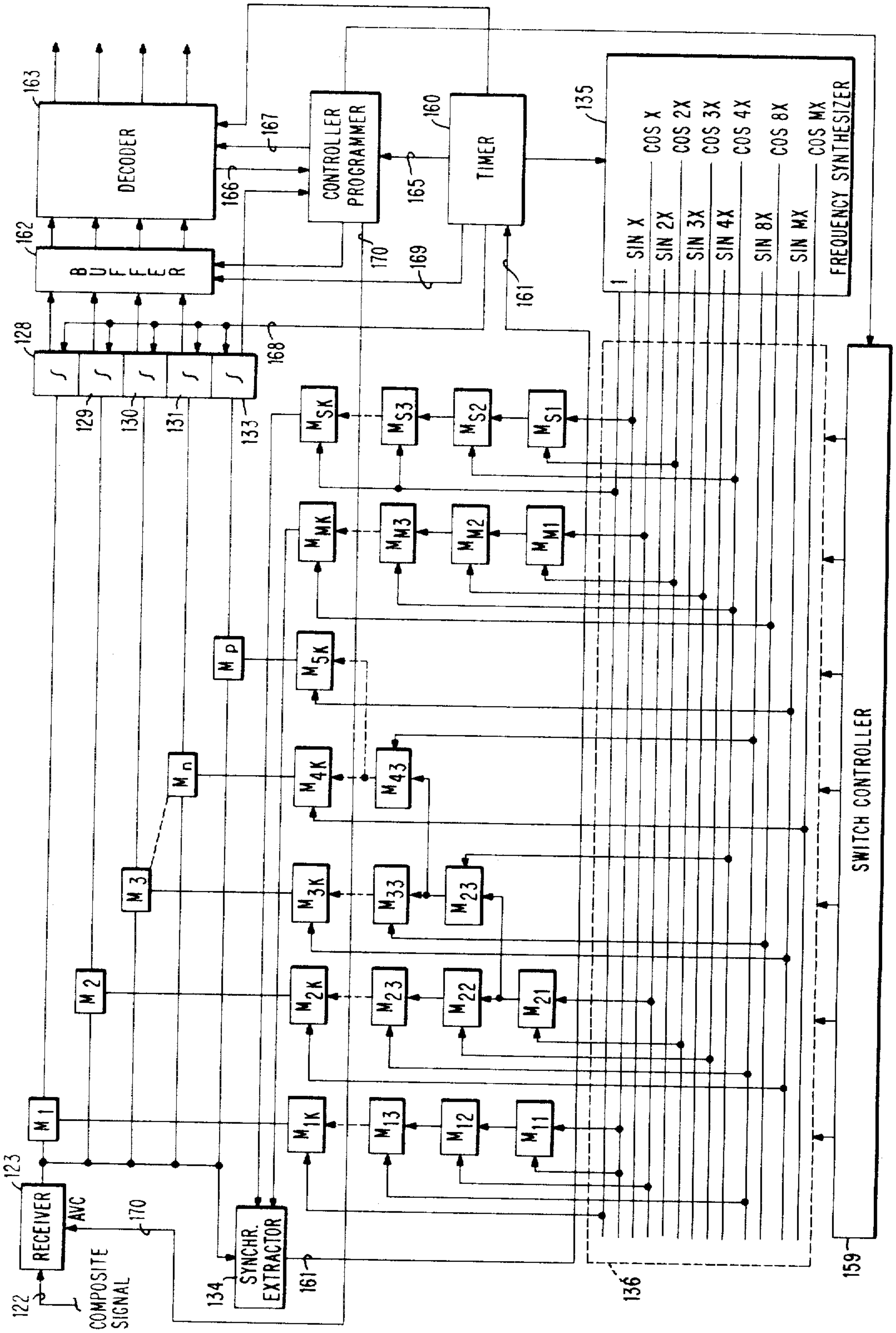
FIG. 8 shows a detailed block diagram of the receiving station of a digital communication system using multiple-factor product waveforms.

FIGS. 7 and 8 show detailed block diagrams of the transmitting station and receiving station, respectively, of a digital communication system using my multiple-factor product waveforms. The structure and operation of this system should be readily comprehensible in view of the above-described communication system using two-factor product waveforms. The multiple-factor system may be viewed as an extension of the simpler two-factor system. In fact, the major difference between the multiple-factor system and the two-factor system is that a chain of two-factor analog multipliers is required to generate the multiple-factor product waveforms whereas only a single multiplier is required to generate a two-factor waveform.

Referring to the transmitting station shown in FIG. 7, coder 101 receives the data to be transmitted from the input circuits. The data may arrive over a single circuit or in parallel over a number of circuits. If it is desired to operate the communications system in full synchronism with an external source, one of the input circuits may contain synchronization signals or clocking pulses. Such signals will be used to slave timer 103 to said external source of clocking signals. Lacking any such external synchronization signals, timer 103 will produce its own clocking signals with high precision for driving frequency synthesizer 104, coder 1 and controller/programmer 105.

The coder 101 will perform all the functions which are necessary to convert the input information into discrete integer values or continuous values, normally called samples. These are stored, up to $n$ at a time, in buffer 106. Frequency synthesizer 104 generates a plurality harmonics of the fundamental frequency $f_0$, each harmonic is split into its sine and cosine components. The timer 103 sends control signals to the buffer 106 at the end of each timing interval $T=1/2f_0$. These timing signals erase content of the storage circuits of the buffer and transfer the next group of samples to the output circuits to hold them over the next timing interval, acting as constant multipliers for he analog gates $G_1$, $G_2$, $G_3$, $G_n$ in FIG. 7. Such analog gates are essentially balanced amplifiers whose output is a linear polarized function of the input and of the control voltage submitted by the buffer output circuits.

A switching matrix or patch panel 114 is responsible for selecting the factors for each waveform of the total set of multiple-factor product waveforms participating in any given embodiment of the invention. Crossbar switches, reed relays, or permanent junctions connect the lowest frequency of the first waveform to one terminal of multiplier $M_{11}$. Assuming that the orthogonal subset of level 8 containing 16 waveforms is to be generated, the first waveform is of fourth order and class 8. It is formed by the product sine $\omega_0 t\cdot\sin 2\omega_0 t\cdot\sin 4\omega_0 t\cdot\sin 8\omega_0 t$. In this case, multiplier $M_{11}$ multiplies $\sin \omega_0 t\cdot\sin 2\omega_0 t$. The respective connections are shown in FIG. 7. Multiplier $M_{12}$ multiplies this product with the factor $\sin 4\omega_0 t$. The resulting product is multiplied with $\sin 8\,\omega_0 t$ in multiplier $M_{13}$. Further multipliers are not needed for this waveform. This is symbolized by connecting the second terminal of multiplier $M_{1k}$ to a neutral terminal of frequency synthesizer 104.

Many waveforms have some partial products in common. The connections indicated in FIG. 7, for example, could serve to generate the following waveforms:

$$\sin 2\omega_0 t\cdot\sin 3\omega_0 t\cdot\sin 4\omega_0 t\cdot\sin 8\omega_0 t\cdot\sin m\omega_0 t \text{ leading to } G_2 \quad (8)$$

$$\sin 2\omega_0 t\cdot\sin 3\omega_0 t\cdot\cos 4\omega_0 t\cdot\cos 8\omega_0 t\cdot\sin m\omega_0 t \text{ leading to } G_3 \quad (9)$$

$$\sin 2\omega_0 t\cdot\sin 3\omega_0 t\cdot\cos 4\omega_0 t\cdot\sin 8\omega_0 t\cdot\cos m\omega_0 t \text{ leading to } G_n \quad (10)$$

$$\sin 2\omega_0 t\cdot\sin 3\omega_0 t\cdot\cos 4\omega_0 t\cdot\sin 8\omega_0 t\cdot\sin m\omega_0 t \text{ leading to } G_p \quad (11)$$

It is easy to see that any special product waveform may be generated by connecting the multiplier terminals of any series of multipliers to the corresponding outputs of the frequency synthesizer. The analog gate $G_M$ (12) for example will receive the fifth order, $m$-th class waveform;

$$\cos \omega_0 t\cdot\cos 2\omega_0 t\cdot\cos 3\omega_0 t\cdot\cos 4\omega_0 t\cdot\cos m\omega_0 t$$

while the last multiplier chain is shown to be wired to the third order fourth class waveform $\sin \omega_0 t\cdot\cos 2\omega_0 t\cdot\cos 4\omega_0 t$ which is waveform 7 of FIG. 10.

The output of each multiplier chain passes through the previously mentioned analog gate or linear controlled amplifier $G_1$, $G_2$, $G_3$, $G_4$. The outputs of these amplifiers are combined in summation network 119 to form a composite signal, which in turn is applied through a final linear amplifier or operational amplifier 120 to the transmission channel.

There are many applications of product waveforms in adaptive communications systems. In such cases it will be desirable to change the set of waveforms frequently and by automatic electronic means. The switch controller 121 and the controller/programmer 105 are provided for this purpose. The cross-bar switching matrix 114 will now consist of fast acting electronic relays as for example, reed relays which can be activated by switch controller 121. The controller/programmer 105 will give the necessary instructions to the switch controller 121 at the correct time instant. Switch controller 121 will, in turn, activate the relay and establish the new connections which are required to generate an alternate set of waveforms.

FIG. 7 also indicates in symbolic way that at least one of the waveforms may be used to indicate the power level per waveform as will be discussed below. For this purpose, the analog gate $G_p$ is connected to controller/programmer 105 which will modulate the waveform passing through that gate with a factor proportional to the energy per waveform which is available in any particular time interval. This energy will be calculated by the programmer and it will depend on the number of participating waveforms, on the mode of operation and on the coding scheme employed in any particular case. Controller/programmer 105 will simultaneously adjust the gain of the final amplifier 120 in such a way that the desired output power is maintained at the desired, usually constant, level.

FIG. 7 indicates further that one or more waveforms may be used as synchronization or timing waveforms. Their output level and timing is directly controlled by timer 103. In FIG. 7 it is shown that gate $G_M$ and $G_S$ are reserved for this purpose. It is understood that any other single gate or any combinations can be used for this purpose.

All the individual circuits indicated in FIG. 7 are well known in the art. Multipliers $M_{ij}$ are needed in great numbers. They may be of an analog type or a digital type. The first variety can be balanced modulators as described in "The Balanced Modulator as a Correlator for Random Signals," by W. P. Birkemeier and G. R. Cooper, I.R.E. Trans. Circuit Theory, vol. CT 9, December 1962, pp. 417–419; the second variety can be time-division multipliers as described in "An Accurate Analog Multiplier and Divider," by E. Kettel and W. Schneider, I.R.E. Trans. Electronic Computers, vol. EC–10, June 1961, pp. 269–272; or the multipliers $M_{ij}$ may be actually a small real-time special purpose computer. In the latter case all the multiplications for all waveforms could be performed by one and the same digital machine on a real time, programmed basis as described in "Computer Multiplication and Division Using Binary Logarithms," by J. N. Mitchell, Jr., I.R.E. Trans. Electron, Computers, vol. EC–11, August 1962, pp. 512–517. The most promising technique for future applications of circuits with a large number of multiplier elements is the solid state technology in microminiaturized units. Various approaches are under development, using either the Hall effect as in "Development of an Analog Multiplier, Based on the Hall Effect," Report AMRL TDR 63–50, 75 pages, April 1959-April 1963, Batelle Memorial Inst., Columbus, Ohio, AD 410 897; "Applications of the Hall Effect Semiconductor Multiplier," by C. Venditti, Report No. R426, Instr. Lab., M.I.T., Cambridge, Mass., November 1963, 61 pages, AD 439 618; or the field effect transistor as in "An Analog Multiplier Using Two Field Effect Transistors," by W. E. Highleyman and E. S. Jacob, I.R.E. Trans. Commun. Syst., vol. CS–10, No. 3, September 1962, pp. 311–317, or controlled superconductors as in "Operational Amplifiers Using Controlled Superconductors," by P. M. Chirlian and V. A. Marsocci, I.R.E. Trans. Electron. Comp., vol. EC 11, February 1962, pp. 6–9.

FIG. 8 is a block diagram of the receiving station for multiple factor product waveforms. It is a correlation type of receiver, wherein the incoming composite signal 122 is first filtered, amplified, and, when necessary, converted to a convenient intermediate frequency channel. Receiver 123 performs these functions. The actual correlation section comprises the multipliers $M_1$ to $M_n$ and integrators 128, 129, 130 . . . 131. There are $n$ such multipliers and $n$ such integrators corresponding to the $n$ waveforms which can be generated by the transmitter and which have been assigned as information carriers. Some other waveforms, as explained earlier, are reserved for power control and for synchronization purposes. Multiplier $M_p$ and integrator 133 serve as correlator for the power control waveform. The synchronization waveforms will be detected in the synchronization extractor 134.

The correlation operation of the receiver resembles the operation of the two-factor waveform receiver described above. It requires that each of the multipliers $M_i$, $M_j$, $M_n$ be fed at its other terminal a locally generated, noise-free waveform which is exactly identical to one of the waveforms generated by the transmitter. These locally generated clean waveforms are produced by frequency synthesizer 135, switching matrix 136 and a number of multipliers $M_{ij}$ in exactly the same way as in the transmitting station. Also, the switch controller 159 and the timer 160 perform the same functions as their counterparts at the transmitting side.

The timer 160 is slaved to the timer 103 at the transmitting side. This can be done in several well known ways. One convenient way is to use one or more of the waveforms for synchronization purposes. Timer 103 at the transmitting side releases these signals at convenient timing instants by the operation of the gates $G_M$ and $G_J$. The synchronization signal extractor 134 contains special correlation detectors for these signals and provides the timing information via line 161 to the receiver timer 160. There are many modes for acquiring synchronization at the beginning of a transmission and for maintaining synchronism during a transmission. Some of these modes will be mentioned in the "OPERATION" section below.

The output of integrators 128 to 133 is sampled at the end of each transmission interval, i.e., at the point of maximum cross-correlation between the incoming waveforms and the locally generated waveforms. These sample values are transferred to the buffer 162 where they are held during the next receiving interval or at least during a part of this interval. During this time the decoder 163 will perform the actual decision and decoding operation. The details of this operation depend on the selected communication mode, which could be either analog or digital, and which may or may not contain redundancy for error control, and which may have provision for retransmission of badly received signals or blocks of signals. The decoder will be wired or programmed to perform the optimum decoding procedure for the selected communication mode. A preferred type of decoding operation for orthonormal digital systems is the maximum likelihood decoder, which is well known in the art. A maximum likelihood decoder investigates al the samples from the integrators 128 and 131 at the end of a transmission interval and selects one or more of the largest outputs as the "most likely" transmitted signals. Many other decoding operations are known in the art and may be readily applicable in this case.

For many types of channels an adaptive operation is desirable. In such case the communication mode will be changed during operation of the system, either according to a preprogrammed arrangement or in dependence on certin observations or measurements performed during the operation. The controller/programmer 164 is provided for the purpose of initiating such changes of the communication mode at the correct instants. It is slaved to timer 160 via line 165 and it exchanges information with decoder 163 via lines 166 and 167. One important function of controller/programmer 164 is the updating of the information about the total transmitted energy in each transmission interval or alternately about the number of waveforms participating in any interval. This information will be conveyed either from controller/programmer 105 at the transmitting station via one or more of the transmitted waveforms or it may be contained in certain messages arriving via the message signals from decoder 163. The former is accomplished by multiplier $M_p$ and integrator 33, the latter by connection 166.

Timer 160 is connected via line 168 to all integrators 128 to 133 for discharging all the integrators to a neutral value immediately after the samples have been transferred to the hold circuits in buffer 162. Such action will be initiated by timer 160 via connection 169.

*Operation of system using multiple-factor product waveforms*

In general, the operation of a communication system using my multiple-factor product waveforms is similar to the operation of the system using two-factor waveforms. The only significant difference is that the transmission waveforms comprise several harmonic factors rather than just two. Therefore, the operation of the systim using multiple-factor product waveforms can be understood by one skilled in the art by reference to the above description of the operation of the system using two-factor waveforms and by reference to the above described structure of the system using multiple-factor waveforms.

As in the case of the system using two-factor product waveforms, the system using multiple-factor product waveforms is capable of several modes of operation. In brief, the system is capable of operation in either the simplex mode wherein only one product waveform is transmitted during each transmission interval, or in the multiplex mode wherein a plurality of waveforms are superposed for transmission during each transmission interval. Further, the system is capable of operation in either the monopolar mode wherein a particular waveform is either transmitted with positive polarity or not transmitted at all during each transmission interval, or in the bipolar mode wherein each waveform is transmitted with either positive polarity or negative polarity during each transmission interval. In addition decoder 163 of the receiving station shown in FIG. 8 can employ either a largest-of-$m$-decider or a maximum likelihood decider. Further, the system using multiple-factor waveforms is capable of transmitting either digital or sampled analog information.

Synchronization signals can be transmitted concurrently with the information signals. Some of the waveforms with discontinuities at the limits of the transmission interval can be used for the purpose of synchronization. If, for example, waveform $f_7$ in FIG. 10 is operated continuously (i.e., with change in polarity from interval to interval) and with constant amplitude, then it does not show any discontinuities at the end of the tranmission intervals. Still its cross-correlation with the local replica at the receiver only yield maximum output if the local replica is exactly in phase, i.e., if the discharge of the integrators is taking place at the correct instant. This fact can be used to operate a phase-lock loop in the receiver synchronization extractor 134, which will keep the timer 160 in accurate phase with the incoming composite signals 122. It is also possible to use the zero cross-correlation with the complementary waveform, which is, in this case, waveform $f_8$ in FIG. 10. Synchronization extractor 134 will then lock on the minimum output instead of the maximum output. A balanced arrangement using both these techniques simultaneously will provide a very efficient mode of synchronization.

Notice also that all waveforms which contain the fundamental harmonic factors (sin $\omega_0 t$ or cos $\omega_0 t$) change polarity from interval to interval. The fundamental period for synchronization purposes is therefore two transmission intervals long. If the receiver's timer is well synchronized (in phase-locked mode) with this fundamental period $T_s=2T=1/f_0$ then there is no problem because all receiver waveforms exhibit the same changes of polarity as the corresponding transmitter waveforms. The use of waveforms such as $f_7$ in FIG. 10 will automatically secure phase lock with the fundamental period $1/f_0$ and will exclude the possibility of the receiver locking on 180° out of phase with the transmitter.

Power control signals can also be transmitted concurrently with the information signals in the multiplex mode of operation. Such power control signals are particularly important when applying an energy sharing principle to the transmission of my product waveforms. The application of the energy sharing principle provides a simple control action at the transmitter which increases or decreases the gain of an output amplifier 120 (FIG. 7) in dependence on the total number of waveforms participating in a particular transmission interval in such a way that the average output power remains constant. In other words, the total energy available during any particular transmission interval will always be correctly shared between all participating waveforms. Accordingly, the receiver must be informed, from interval to interval, about the gain factor applied to the transmitted waveforms or composite signal so as to achieve constant output energy from interval to interval. This is done by the power control signals. The receiving station can use the power control signals either to control the gain of receiving unit 123 (backward control) or to control the decision levels of the threshold devices in decoder 163 (forward control).

The advantage of such an energy sharing operation is that all signals in any given transmission interval will assume the highest amplitude possible in view of system energy limitations, thus reducing the influence of spurious channel noise.

There are several useful intermediate modes of operation between the simplex mode and the multiplex mode with a complete set of waveforms. Any restriction of the full multiplex operation to a type of "K out of $n$" operation gives the receiver of FIG. 8 additional priori information about the composite signal which will be used in decoder 163 as a check on the received information. If, for example, the system uses a set of 32 orthogonal waveforms (order 5, class 16), but imposes the rule that, during each transmission interval only 4 of the 32 waveforms will be transmitted simultaneously, the receiver may reject the information received during a particular interval, whenever either less or more than 4 waveforms are detected.

A critical operational problem for many higher order data transmission systems is the acquisition of synchronization. It is apparent that the correlation detector cannot operate satisfactorily before the receiver timer 160 is accurately slaved to the transmitter timer 103. The signals which serve to maintain synchronization, once acquired, may be product waveforms which need the operation of the correlation detector for their best possible detection. Thus, it is a problem to get the system synchronized rapidly in the first instance. My product waveforms offer an excellent means for overcoming this problem by using the previously mentioned small-band waveforms during the acquisition phase. It is possible to filter out and detect these waveforms in synchronization extractor 134 by means of special small-band filters, which do not depend on the correlation detector for their proper operation. The clocking rate thus acquired is forwarded via connection 161 to the timer 160, which in turn starts the operation of the correlation detector. Accurate establishment of the correct phase and locking on to this phase can now be achieved with other, preferably pulsive, synchronization waveforms which will be detected by correlation procedures using locally generated replicas thereof. The higher the class and the order of the waveforms, the larger the total number of waveforms which can be generated, and the easier it will be to find suitable waveforms for such special service functions, without running into excessive mutual cross-talk between information carrying waveforms and auxiliary service waveforms.

While the invention has been particularly shown and described with reference to particular embodiments, it will be understood by those skilled in the art that changes in form and details may be made therein without departing from the spirit and scope of the invention.

I claim:

1. A communication system for transmitting digital information comprising:

a transmitter including means for encoding each elemental message portion into one of a predetermined set of wideband waveforms defined by the product of a plurality of harmonically related sinusoids over an interval equal to one-half the period of the fundamental frequency; and a receiver including optimum detection means for detecting which members of the set of wideband waveforms were transmitted.

2. A digital communication system for transmitting information expressed in high order alphabets, comprising:

means for generating a set of wideband transmission waveforms defined by the product of a plurality of harmonically related sinusoids over an interval equal to one half the period of the fundamental frequency;

a transmission channel;

means responsive to input information for selectively gating members of said set of wideband transmission waveforms into said transmission channel; and optimum detection means responsive to signals in said transmission channel for determining which members of said set of wideband transmission waveforms were gated into said transmission channel.

3. A digital communication system for communicating information expressed in high order alphabets, comprising:

first generating means for generating a set of wideband waveforms each member of which is defined by the product of a plurality of harmonically related sinusoids over an interval equal to one-half the period of the fundamental frequency;

a transmission channel;

means responsive to input information for selectively gating members of said set of wideband waveforms into said transmission channel;

second generating means for generating a set of wideband waveforms matching the wideband waveforms generated by said first generating means;

cross-correlation means for cross-correlating the signals from said transmission channel with each of the wideband waveforms generated by said second generating means; and decision means responsive to said cross-correlation means for determining which members of said set of wideband waveforms were gated into said transmission channel.

4. A digital communication system for communicating information expressed in high order alphabets comprising:

means for generating a plurality of harmonically related sinusoids;

multiplying means for multiplying groups of said harmonically related sinusoids so as to produce a set of product waveforms;

a transmission channel;

means responsive to the input information for selectively gating members of said set of product waveforms into said transmission channel; and optimum detection means responsive to signals from said transmission channel for determining which members of said set of product waveforms were gated into said transmission channel.

5. A digital communication system of the type described in claim 4, including selection means selecting groups of harmonically related sinusoids, wherein said multiplying means multiplies said selected groups of harmonically related sinusoids so as to produce a set of orthogonal product waveforms.

6. A digital communication system of the type described in claim 4, including selection means selecting groups of harmonically related sinusoids, wherein said multiplying means serves to multiply said selected groups of harmonically related sinusoids so as to produce a set of product waveforms wherein each factor of each product waveform is of double the frequency of the previous factor.

7. A digital communication system for communicating information expressed in high order alphabets, comprising:

first generating means for generating a plurality of harmonically related sinusoids;

first multiplying means connected to said first generating means for multiplying selected groups of harmonically related sinusoids so as to form a set of wideband product waveforms;

a wideband transmission channel;

means responsive to input information for selectively gating a member of the set of product waveforms into said transmission channel during each transmission interval;

second generating means for generating a plurality of harmonically related sinusoids corresponding to the sinusoids generated in said first generating means;

second multiplying means connected to said second generating means for multiplying selected groups of harmonically related sinusoids so as to form a set of product waveforms corresponding to the set of product waveforms formed by said first multiplying means;

cross-correlating means for cross-correlating the signals from said transmission channel with each of the product waveforms formed by said second multiplying means; and decision means responsive to said cross-correlating means for determining which member of the set of product waveforms was gated into said transmission channel during each transmission interval.

8. A digital communication system of the type described in claim 7 wherein said first multiplying means comprises means for multiplying selected pairs of harmonically related sinusoids and wherein said second multiplying means comprises means for multiplying corresponding pairs of harmonically related sinusoids.

9. A digital communication system of the type described in claim 7 wherein said first multiplying means comprises a plurality of chains of analog two-factor multipliers, and switching means for interconnecting said multipliers so as to multiply selected groups of harmonically related sinusoids to form a set of multiple factor produst waveforms; and wherein said secind multiplying means comprises a plurality of chains of analog two-factor multipliers, and switching means for interconnecting said multipliers so as to multiply selected groups of harmonically related sinusoids so as to form a corresponding set of multiple-factor product waveforms.

10. A digital communication system of the type described in claim 7 wherein the cross-correlating means comprises:

third multiplying means for multiplying each of the product waveforms formed by said second multiplying means with the signals in the transmission channel; and integrating means connected to said third multiplying means for integrating each of the resulting product signals.

11. A digital communication system of the type described in claim 10 wherein the decision means comprises:

a largest-of-*m*-decider connected to said integrating means for determining which one of the integrated resulting product signals is of greatest magnitude.

12. A digital communication system of the type described in claim 10 wherein the decision means comprises:

a maximum likelihood decider connected to said integrating means for determining which one of the integrated resulting product signals has the highest probability of being the response to the transmitted waveform.

13. A digital communication system for communicating information expressed in high order alphabets, comprising:

first generating means for generating a plurality of harmonically related sinusoids;

first multiplying means connected to said first generating means for multiplying selected groups of harmonically related sinusoids so as to form a set of wideband product waveforms;

a transmission channel;

means responsive to input information for selectively gating a combination of members of the set of product waveforms into said transmission channel during each transmission interval;

second generating means for generating a plurality of harmonically related sinusoids corresponding to the sinusoids generated in said first generating means;

second multiplying means connected to said second generating means for multiplying selected groups of harmonically related sinusoids so as to form a set of product waveforms corresponding to the set of product waveforms formed by said first multiplying means;

cross-correlating means for cross-correlating the signals in said transmission channel with each of the product waveforms formed by said second multiplying means; and decision means responsive to said cross-correlating means for determining which members of the set of product waaveforms were gated into said transmission channel during each transmission interval.

14. A digital communication system of the type described in claim 13 wherein said first multiplying means comprises means for multiplying selected pairs of harmonically related sinusoids and wherein said second multiplying means comprises means for multiplying corresponding pairs of harmonically related sinusoids.

15. A digital communication system of the type described in claim 13 wherein said first multiplying means comprises a plurality of chains of analog two-factor multipliers, and switching means for interconnecting said multipliers so as to multiply selected groups of harmonically related sinusoids to form a set of multiple-factor product waveforms; and wherein said second multiplying means comprises a plurality of chains of analog two-factor multipliers, and switching means for interconnecting said multipliers so as to multiply selected groups of harmonically related sinusoids so as to form a corresponding set of multiple-factor product waveforms.

16. A digital communication system of the type described in claim 13 wherein the cross-correlating means comprises:

third multiplying means for multiplying each of the product waveforms formed by said second multiplying means with the signals in the transmission channel; and integrating means connected to said third multiplying means for integrating each of the resulting product signals.

17. A digital communication system of the type described in claim 16 wherein the decision means comprises:

a threshold device connected to the output of each of said integrating means for determining which ones of the integrated resulting product signals contain transmitted information.

18. A digital communication system for communicating information expressed in high order alphabets, comprising:

first generating means for generating a plurality of harmonically related sinusoids;

first multiplying means connected to said first generating means for multiplying selected groups of harmonically related sinusoids so as to form a set of wideband product waveforms;

means responsive to input information for selectively defining the polarity of the members of the set of product waveforms;

a wideband transmission channel;

means for introducing the set of product waveforms into said transmission channel during each transmission interval;

second generating means for generating a plurality of harmonically related sinusoids corresponding to the sinusoids generated in said first generating means;

second multiplying means connected to said second generating means for multiplying selected groups of harmonically related sinusoids so as to form a set of product waveforms corresponding to the set of product waveforms formed by said first multiplying means;

cross-correlating means for cross-correlating the signals in said transmission channel with each of the product waveforms formed by said second multiplying means; and decision means responsive to said cross-correlating means for determining the polarity of each member of the set of product waveforms transmitted during each transmission interval.

19. A digital communication system for communicating information expressed in high order alphabets comprising:

first generating means for generating a plurality of harmonically related sinusoids;

first multiplying means connected to said first generating means for multiplying selected groups of harmonically related sinusoids so as to form a set of wideband product waveforms;

a wideband transmission channel;

means responsive to input information for selectively gating a combination of members of the set of product waveforms into said transmission channel during each transmission interval, and for selectively defining the polarity of said members;

second generating means for generating a plurality of harmonically related sinusoids corresponding to the sinusoids generated in said first generating means;

second multiplying means connected to said second generating means for multiplying selected groups of harmonically related sinusoids so as to form a set of product waveforms corresponding to the set of product waveforms formed by said first multiplying means;

cross-correlating means for cross-correlating the signals in said transmission channel with each of the product waveforms formed by said second multiplying means; and decision means responsive to said cross-correlating means for determining which members of the set of product waveforms were gated into said transmission channel during each transmission interval, and for determining the polarity of said members.

20. A digital communication system for communicating information expressed in high order alphabets, comprising:

a first plurality of sine wave generators for generating a plurality of harmonically related sine waves;

a first plurality of product modulators;

a first patch board for selectively connecting groups of said sine wave generators to said product modulators so as to form a set of product waveforms defined by the product of a plurality of harmonically related sine waves;

a transmission channel;

gating means connected to said product modulators for selectively gating members of the set of wideband waveforms into said transmission channel in response to input information;

a second plurality of sine wave generators for generating a plurality of harmonically related sinusoids corresponding to the sinusoids generated in said first plurality of sine wave generators;

a second plurality of product modulators;

a second patch board for selectively connecting groups of said second sine wave generators to said second product modulators so as to form a set of product waveforms corresponding to the product waveforms formed by said first patch board;

cross-correlating means connected to said transmission channel for cross-correlating the transmitted signals with the product waveforms formed by said second patch board; and decision means responsive to said cross-correlating means for determining which members of the set of product waveforms were gated into said transmission channel.

21. A communication system for transmitting digital information comprising:

a transmitter including means for encoding each elemental message portion into one of a predetermined set of wideband waveforms defined by:

$$f(t)=A\sin\left(k\omega_0 t+r\frac{\pi}{2}\right)\sin\left(m\omega_0 t+s\frac{\pi}{2}\right)$$

where $$-\frac{\pi}{2}\leq\omega_0 t\leq+\frac{\pi}{2}f(t)=0$$

where $$\omega_0 t<-\frac{\pi}{2},\ +\frac{\pi}{2}<\omega_0 t$$

$k$ and $m$ being integers; $0\leq k<m$; $1\leq m\leq M$; $r$, $s=0$, 1; and excluding the case where $r$ and $k$ equal zero simultaneously; and a receiver including optimum detection means for detecting which members of the set of wideband waveforms were transmitted.

22. A communication system for transmitting digital information comprising:

a transmitter including means for encoding each elemental message portion into one of a predetermined set of wide band waveforms defined by:

$$f(t)=A\sin\left(S_1\omega_0t+r_1\frac{\pi}{2}\right)\sin\left(2S_2\omega_0t+r_2\frac{\pi}{2}\right)\ldots\sin\left(kS_k\omega_0t+r_k\frac{\pi}{2}\right)$$

where $$-\frac{\pi}{2}\leq\omega_0t\leq+\frac{\pi}{2}f(t)=0$$

where $$\omega_0t<-\frac{\pi}{2},\ +\frac{\pi}{2}<\omega_0t$$

$k$ being a positive integer, $S_1$, $S_2$ . . . $S_i$, . . . $S_{k-1}$, $S_k$ may assume the value of 0 or 1, $r_1$, $r_2$ . . . $r_i$ . . . $r_{k-1}$, $r_k$ may assume the value of 0 or 1, but $S_i$ and $r_i$ may not assume 0 simultaneously, and a receiver including optimum detection means for detecting which members of the set of wide band waveforms were transmitted.

References Cited

UNITED STATES PATENTS

| | | | |
|---|---|---|---|
| 3,037,190 | 5/1962 | Herbst | 340—170 |
| 3,305,676 | 2/1967 | Honore et al. | 235—197 |

ROBERT C. BAILEY, *Primary Examiner.*

R. RICKERT, *Assistant Examiner.*